(12) United States Patent
Cacioppo

(10) Patent No.: US 12,498,725 B2
(45) Date of Patent: Dec. 16, 2025

(54) SYSTEMS, APPARATUS, AND METHODS TO FACILITATE DOCKING OF ROBOTIC VEHICLES WITH PLATFORMS

(71) Applicant: Ocado Innovation Limited, Hatfield (GB)

(72) Inventor: Christopher Cacioppo, Somerville, MA (US)

(73) Assignee: Ocado Innovation Limited, Hatfield (GB)

( * ) Notice: Subject to any disclaimer, the term of this patent is extended or adjusted under 35 U.S.C. 154(b) by 197 days.

(21) Appl. No.: 18/075,156

(22) Filed: Dec. 5, 2022

(65) Prior Publication Data

US 2024/0184295 A1 Jun. 6, 2024

(51) Int. Cl.
| | |
|---|---|
| G05D 1/667 | (2024.01) |
| B66F 9/06 | (2006.01) |
| B66F 9/075 | (2006.01) |
| G05D 1/00 | (2024.01) |
| G05D 1/243 | (2024.01) |

(52) U.S. Cl.
CPC .......... *G05D 1/0225* (2013.01); *B66F 9/063* (2013.01); *B66F 9/0755* (2013.01); *G05D 1/0088* (2013.01); *G05D 1/0246* (2013.01); *G05D 1/667* (2024.01); *G05D 1/243* (2024.01)

(58) Field of Classification Search
CPC .. G05D 1/0225; G05D 1/0088; G05D 1/0246; G05D 1/243; G05D 2105/28; G05D 2107/70; G05D 2109/10; G05D 2111/10; G05D 1/667; B66F 9/0755; B66F 9/24; B66F 9/063

See application file for complete search history.

(56) References Cited

U.S. PATENT DOCUMENTS

| | | | | |
|---|---|---|---|---|
| 9,834,380 | B2 * | 12/2017 | Hamilton | B65G 1/1373 |
| 10,048,398 | B2 * | 8/2018 | Rose | G05D 1/0225 |
| 10,640,347 | B2 * | 5/2020 | Shah | B66F 9/0755 |
| 12,008,788 | B1 * | 6/2024 | Li | G06N 3/045 |
| 12,145,803 | B1 * | 11/2024 | Duke | B65G 1/1371 |
| 2009/0271058 | A1 * | 10/2009 | Chilson | B66F 9/063 |
| | | | | 701/23 |

(Continued)

OTHER PUBLICATIONS

International Searching Authority, "International Search Report," mailed in connection with International Patent Application No. PCT/EP2023/084369, on Feb. 2, 2024, 4 pages.

(Continued)

*Primary Examiner* — Sohana Tanju Khayer
(74) *Attorney, Agent, or Firm* — Hanley, Flight & Zimmerman, LLC

(57) ABSTRACT

Systems, apparatus, and methods to facilitate docking of robotic vehicles with platforms are disclosed. An example apparatus includes memory; machine readable instructions; and processor circuitry to execute the machine readable instructions to identify a property associated with a platform; determine a confidence associated with docking the platform and an autonomous vehicle based on the property associated with the platform; identify a positioning maneuver to be performed by the autonomous vehicle relative to the platform based on the confidence and the property of the platform; and output an instruction to cause the autonomous vehicle to perform the positioning maneuver.

20 Claims, 11 Drawing Sheets

(56) References Cited

U.S. PATENT DOCUMENTS

| | | | |
|---|---|---|---|
| 2018/0084242 A1 | 3/2018 | Rublee et al. | |
| 2018/0134531 A1* | 5/2018 | Tanaka | B66F 9/063 |
| 2018/0304468 A1* | 10/2018 | Holz | B25J 9/1697 |
| 2018/0305076 A1* | 10/2018 | Lee | B64C 1/20 |
| 2019/0231460 A1* | 8/2019 | DiMaio | A61B 46/00 |
| 2020/0376662 A1* | 12/2020 | Arase | B25J 9/1664 |
| 2020/0386605 A1* | 12/2020 | Oren | B66F 17/006 |
| 2021/0141368 A1* | 5/2021 | Holwell | G05B 19/41895 |
| 2021/0300744 A1* | 9/2021 | Bailey | E02F 9/2033 |
| 2021/0309501 A1* | 10/2021 | Takao | B66F 9/07581 |
| 2022/0118621 A1* | 4/2022 | Paulitsch | B25J 13/089 |
| 2022/0227001 A1* | 7/2022 | Fry | B25J 13/087 |
| 2022/0281728 A1* | 9/2022 | Weiss | G05D 1/0038 |
| 2022/0379792 A1* | 12/2022 | Wehner | B66F 9/063 |
| 2022/0380063 A1* | 12/2022 | Shah | B64F 1/362 |
| 2022/0404829 A1* | 12/2022 | Nister | G05D 1/0212 |
| 2023/0147974 A1* | 5/2023 | Martin, Jr. | B65G 1/1371 414/799 |
| 2024/0124236 A1* | 4/2024 | Davolio | B65G 47/914 |
| 2024/0135305 A1* | 4/2024 | Caron | G06Q 10/0833 |
| 2024/0150159 A1* | 5/2024 | Melchior | B66F 9/0755 |
| 2024/0174499 A1* | 5/2024 | Ignatov | B66F 9/0755 |
| 2024/0395287 A1* | 11/2024 | Gras | G06T 11/60 |

OTHER PUBLICATIONS

International Searching Authority, "Written Opinion," mailed in connection with International Patent Application No. PCT/EP2023/084369, on Feb. 2, 2024, 8 pages.

International Preliminary Report on Patentability issued on Jun. 19, 2025 by the International Bureau in corresponding PCT Application No. PCT/EP2023/084369 (7 pages) corresponding to Applicant's U.S. Appl. No. 18/075,156.

* cited by examiner

SYSTEMS, APPARATUS, AND METHODS TO FACILITATE DOCKING OF ROBOTIC VEHICLES WITH PLATFORMS

FIELD OF THE DISCLOSURE

This disclosure relates generally to robotic vehicles and, more particularly, to systems, apparatus, and methods to facilitate docking of robotic vehicles with platforms.

BACKGROUND

A robotic vehicle (e.g., a robotic truck) can include forks (also referred to as tynes or tines) to enable the vehicle to pick up and move object(s) (e.g., a pallet) in an environment such as a warehouse.

BRIEF DESCRIPTION OF THE DRAWINGS

In general, the same reference numbers will be used throughout the drawing(s) and accompanying written description to refer to the same or like parts. The figures are not to scale.

Figure 1:
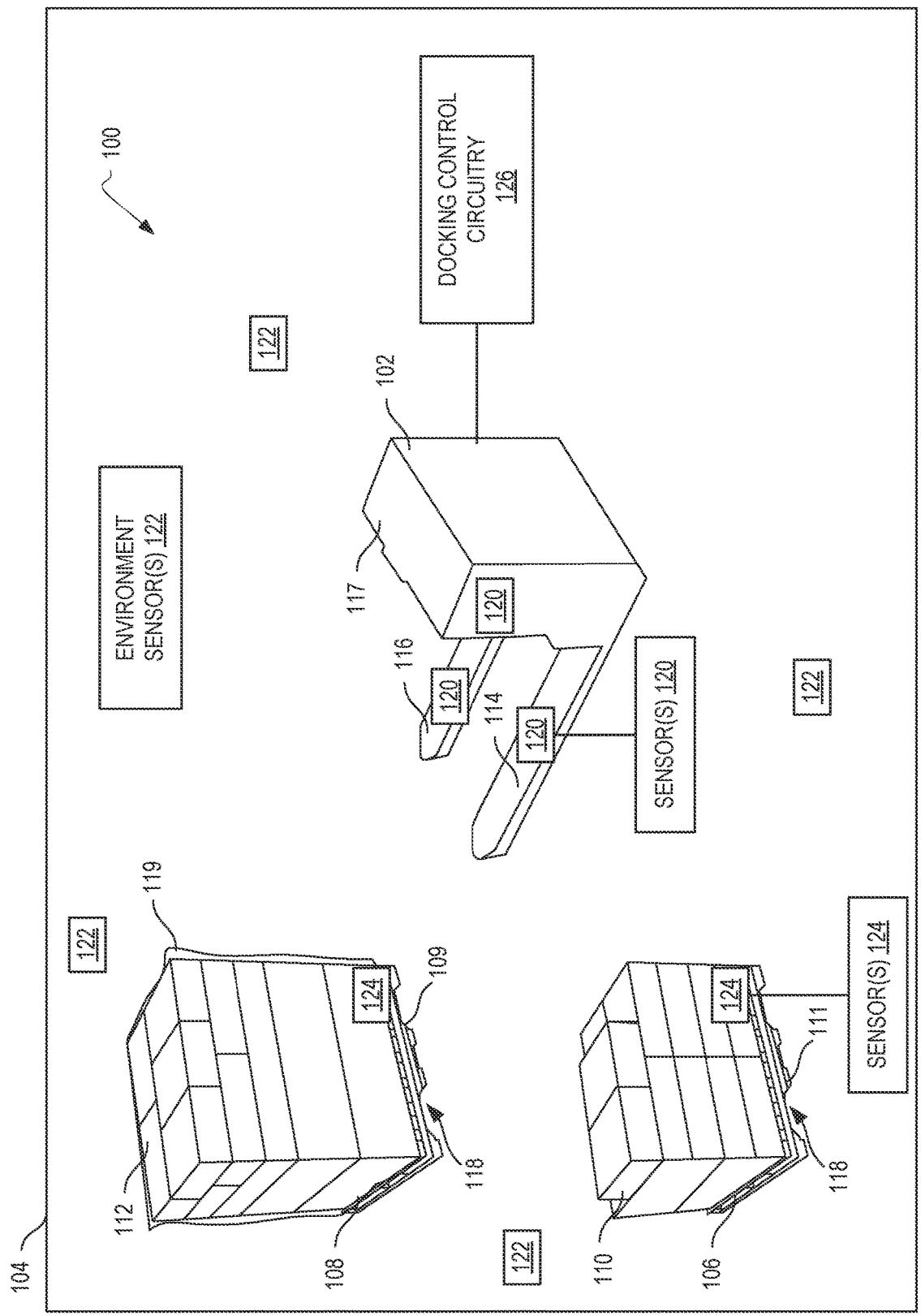
FIG. 1 illustrates an example environment including a robotic vehicle and platforms for transport via the robotic vehicle in accordance with teachings of this disclosure

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A platform such as a pallet may be used in a warehouse to support goods and to enable the goods to be carried from one location to another while on the platform. Platforms can vary in size, shape, material(s), weight, state of repair, etc. Also, placement of a platform in the warehouse can affect access to the platform. For instance, the platform may be positioned between other platforms and/or against one or more walls.

A robotic vehicle such as an autonomous vehicle can include forks to pick up a platform such as a pallet (e.g., where platform includes openings to receive the forks) and to move the platform to another location in the environment. However, differences in the properties and/or locations of respective platforms can affect the ability of the robotic vehicle to dock with (e.g., autonomously engage or interface with) a platform for purposes of transporting (e.g., carrying, moving) the platform. Also, the platform may or may not be supporting a load (e.g., goods). The presence or absence of goods supported by the platform, the type of goods, the placement of the goods on the platform, etc. can also affect the ability of the robotic vehicle to autonomously dock with (e.g., engage with) the platform for transportation purposes.

Disclosed herein are example machine-learning trained robotic vehicles (e.g., autonomous vehicles, robotic trucks, robotic pallet jacks) having forks to support and/or carry object(s), such as a platform including goods, in an environment such as a warehouse. Examples disclosed herein train a robotic vehicle to dock with platforms such as pallets using machine learning. Examples disclosed herein generate machine learning docking algorithm(s) to determine a confidence, probability, or likelihood that the robotic vehicle can dock with and/or carry (e.g., transport) a platform without damage or substantial damage to the platform, any load supported by the platform, and/or the vehicle based on variables such as the condition and/or the location of the platform in the environment, the type of load, the placement of the load on the platform, etc. In examples which the likelihood of a successful docking event with the platform is identified (i.e., docking with a pallet without damage or substantial damage to the platform, the load, and/or the robotic vehicle), example machine learning docking algorithm(s) are used to cause the robotic vehicle to perform movements to, for instance, position the forks relative to the platform to enable the robotic vehicle to carry (e.g., lift) the platform based on properties of the platform and/or the load. For instance, if a heavy load is disposed on one side of the platform, the example machine learning algorithms disclosed herein can be trained to cause the robotic vehicle to center the forks under the load to reduce the chances the load of tipping during transportation.

Examples of robotic vehicles disclosed herein include sensors (e.g., image sensors, distance sensors, force sensors, etc.) to, for instance, monitor the engagement of the forks with the platform. Examples disclosed herein can dynamically adjust operation of the robotic vehicle to, for instance, abort efforts to lift the platform if the sensor data indicates that a surface of the platform is damaged (e.g., where the surface was obscured from view when the initial confidence determination was made). Examples disclosed herein can generate instructions to cause the robotic vehicle to perform maneuvers to disengage with the platform when the robotic vehicle has arrived at a destination to further prevent damage or substantial damage to the platform, the load, and/or the vehicle.

FIG. 1 illustrates an example system 100 including a robotic vehicle 102 to dock or engage with a platform located in an environment 104 to carry and move the platform. The environment 104 can include, for instance, a warehouse. In the example of FIG. 1, a first platform 106 and a second platform 108 are located in the environment 104. Additional platforms 106, 108 and/or robotic vehicles 102 can be located in the environment 104.

The first platform 106 can include a pallet having a surface 109 to support a first load 110. The second platform 108 can include a pallet having a surface 111 to support a second load 112. The first and second loads 110, 112 can include, for instance, inventory (e.g., goods). In some examples, the first load 110 and/or the second load 112 is to be moved from a first location to a second location in the environment 104 to, for instance, place the load 110, 112 on a truck. In some examples, the first platform 106 and/or the second platform 108 does not include a load placed thereon. In such examples, the first platform 106 and/or second platforms 106, 108 may be moved from a first location to a second location in the environment 104 to place a load on the respective platforms 106, 108.

The robotic vehicle 102 includes a first fork 114 and a second fork 116 extending from a body 117 of the robotic vehicle 102. The forks 114, 116 can be inserted into (e.g., slid into) one or more openings or slots 118 defined in the first platform 106 to dock with the first platform 106. Put another way, when the forks 114, 116 are inserted into the opening(s) 118, the first platform 106 is engaged or coupled with the first platform 106 such that that robotic vehicle 102 can support or carry the first platform 106 to transport the first platform. For instance, when the robotic vehicle 102 is docked with the first platform 106 via the forks 114, 116, the robotic vehicle 102 can lift from a ground surface on which the first platform 106 rests and carry the first platform 106 to move the first platform 106 in the environment 104. Similarly, the robotic vehicle 102 can dock with the second platform 108 via insertion of the forks 114, 116 in the opening(s) 118 defined in the second platform 108 to transport the second platform 108.

In the example of FIG. 1, the robotic vehicle 102 can include an autonomous vehicle that can dock with the platforms 106, 108 without OR with limited user input control during operation of robotic vehicle 102. For example, the robotic vehicle 102 can autonomously position or maneuver the forks 114, 116 relative to the opening(s) 118 of the respective platforms 106, 108 to insert the forks 114, 116 into the openings 118 without input from a human operator. In some examples, the robotic vehicle 102 is a remotely driven vehicle. In such examples, the robotic vehicle 102 moves to a location in the environment 104 and/or engaged with the platform(s) 106, 108 in response to inputs provided by remote user.

In some instances, differences between properties of the first platform 106 and the second platform 108, the locations of the platforms 106, 108 in the environment 104, and/or the properties of the loads 110, 112 (or absence of the loads 110, 112) can affect the ability of the robotic vehicle 102 to dock with (e.g., autonomously dock with) the platforms 106, 108 to transport the platforms 106, 108 and any loads 110, 112 supported by the platforms 106, 108. In particular, the platform, load, and/or environment variables as well as specification of the robotic vehicle 102 (e.g., weight capacity, fork size) can affect the ability of the robotic vehicle 102 to dock with (e.g., engage with, couple to, interface with) and/or carry the platform(s) 106, 108 without damage or substantial damage to the platform(s) 106, 108; the load(s) 110, 112; and/or the robotic vehicle 102. For example, properties of the first platform 106, such as a size, a shape, and/or a material of the first platform 106 can differ from properties of the second platform 108. Thus, the robotic vehicle 102 may perform different positioning maneuvers to dock differently with the first platform 106 than the second platform 108. In some examples, the robotic vehicle 102 may not include forks 114, 116 that are, for instance, long enough to support platforms larger than a certain size.

In some examples, a condition or state or repair of the first and second platforms 106, 108 can differ. For instance, the first platform 106 may include damaged (e.g., weakened, warped) portion(s) while the second platform 108 does not include damaged portion(s). If the robotic vehicle 102 places the fork(s) 114, 116 such that the weight of the first platform 106 is supported by the robotic vehicle 102 at the damaged portion(s), the first platform 106 may become further damaged or break.

In some examples, the first platform 106 may be resting in a location in the environment 104 without other platforms and/or objects in the vicinity of the first platform 106. However, the second platform 108 may be, for example, located between two other platforms in the environment 104, located in a corner of a room, on a shelf, below a shelf, etc. Thus, the robotic vehicle 102 may perform different maneuvers to dock with and/or lift the first platform 106 than the second platform 108 based on the differences in location and/or characteristics of the environment 104 proximate to the platform(s) 106, 108. For example, when the second platform 108 is located adjacent to (e.g., wedged against) a wall or other pallet, force output by the robotic vehicle 102 when docking with or lifting the second platform 108 can affect (e.g., impact) the other pallet and/or the wall.

As disclosed herein, the first and/or second platforms 106, 108 may or may not be supporting the corresponding load 110, 112 at a given time. The presence or absence of loads 110, 112 supported by the respective platforms 106, 108; the type of load(s) 110, 112; the weight of the load(s) 110, 112; the placement of the load(s) 110, 112 on the platforms 106, 108 can affect the ability of the robotic vehicle 102 to autonomously dock with the platforms 106, 108 for purposes of transporting the platforms 106, 108. For example, a weight distribution of the load 110 may be substantially even across the surface 109 of the first platform 106 while a weight distribution of the load 112 may be substantially located on one side of the surface 111 of the second platform 108. As another example, the load 110 may occupy a substantial area of the surface 109 of the first platform 106 while the load 112 may occupy less than an area of the surface 111 of the second platform 108. Such differences in the loads 110, 112 can affect how the robotic vehicle 102 positions the forks 114, 116 relative to the platforms 106, 108. In some examples, the robotic vehicle 102 may be not able to support certain weights over a particular threshold. As another example, the second load 112 can include wrapping 119 disposed around the second load 112 while the first load 110 does not include the wrapping 119.

The example system 100 of FIG. 1 includes sensors to generate outputs corresponding to data indicative of properties of the platforms 106, 108; the loads 110, 112; and/or the environment 104 with respect to the locations of the platforms 106, 108 and/or other conditions of the environment 104 that can affect docking of the robotic vehicle 102 with the platforms 106, 108. The example robotic vehicle 102 of FIG. 1 includes one or more sensors 120 carried by the body 117 of the robotic vehicle 102 and/or the fork(s) 114, 116. The robotic vehicle sensor(s) 120 can include, for instance, image sensor(s), force sensor(s), weight sensor(s), proximity sensor(s), infrared sensor(s), LIDAR sensor(s), etc.

In some examples, one or more sensors 122 are located in the environment 104. The environment sensor(s) 122 can include, for example, image sensors to capture images of the environment 104 including the platforms 106, 108. In some examples, the platforms 106, 108 include one or more sensors 124 disposed thereon to output signals indicative of, for instance, a weight of the load(s) 110, 112 supported by the platforms 106, 108. The environment sensor(s) 122 and/or the platform sensor(s) 124 can include other types of sensors.

In the example of FIG. 1, the outputs of the sensor(s) 120, 122, 124 are analyzed by docking control circuitry 126 (e.g., processor circuitry) to manage docking of the robotic vehicle 102 with the platform(s) 106, 108. In particular, the docking control circuitry 126 analyzes the outputs of the sensor(s) 120, 122, 124 to detect properties of the platform(s) 106, 108, the load(s) 110, 112, and/or variables (e.g., obstacles, hazards) in the environment 104 that can affect docking of the robotic vehicle 102 with the platform(s) 106, 108. The example docking control circuitry 126 of FIG. 1 executes machine learning model(s) in view of the sensor data to determine whether the robotic vehicle 102 should initiate a docking event (e.g., attempt to dock) with the platform(s) 106, 108 to transport the platform(s) 106, 108. In particular, the docking control circuitry 126 executes the machine learning model(s) to determine a likelihood of the robotic vehicle 102 docking with and/or carrying (e.g., transporting, moving) the platform(s) 106, 108 without damaging or substantially damaging to the platform(s) 106, 108, the load(s) 110, 112, and/or the robotic vehicle 102.

For example, the docking control circuitry 126 can analyze image data output by the sensor(s) 120, 122, 124 to detect a physical property of the platform(s) 106, 108. Properties (i.e., physical properties) of the respective platforms 106, 108 can include, for example, a size of the platform 106, 108; a shape of the platform 106, 108; a material of the platform 106, 108 (e.g., wood, plastic); and/or platform quality. Properties related to the quality of the respective platforms 106, 108 can include construction of the platform 106, 108 (i.e., a platform construction state) or changes to the platform 106, 108 over time (i.e., a platform maintenance state). The platform construction state can account for variables in creating the platform 106, 108, such as whether the platform 106, 108 is formed from scrap wood versus a durable plastic. The platform maintenance state can account effects of, for instance, damage to the platform 106, 108 during use, which can affect structural integrity of the surface(s) of the platform 106, 108, can cause the surface(s) to be become uneven, etc. The quality of the platform(s) 106, 108 (i.e., construction or maintenance state(s)) can affect the ability of the platform 106, 108 to support a load as well as engaging with the fork(s) 114, 116 of the robotic vehicle 102 (e.g., uneven platform surfaces can affect balancing of the platform 106, 108 on the forks 114, 116 of the vehicle 102). Based on the image data and the machine learning model(s), the docking control circuitry 126 determines a confidence of an ability of the robotic vehicle 102 to dock with the platform(s) 106, 108 in view of the physical property of the platform(s) 106, 108; capabilities or specifications of the robotic vehicle 102 (e.g., fork size); and a risk of damage to the platform(s) 106, 108, the load(s) 110, 112, and/or the robotic vehicle 102. As another example, the docking control circuitry 126 can analyze the outputs of the sensor(s) 120, 122, 124 to identify location(s) of the platform(s) 106, 108 in the environment 104 to determine of the robotic vehicle 102 can dock with and/or carry the platform(s) 106, 108 without damaging or substantially damaging, for instance, another platform or wall against with the platform 106, 108 is resting.

If, based on the confidence analysis, the example docking control circuitry 126 determines that the robotic vehicle 102 should initiate the docking event, the docking control circuitry 126 executes the machine learning model(s) to guide the robotic vehicle 102 with respect to engaging with the platform 106, 108. For instance, if the docking control circuitry 126 determines that the robotic vehicle 102 should dock with the first platform 106, the docking control circuitry 126 can generate instructions to cause the robotic vehicle 102 to move the forks 114, 116 (e.g., adjust a width between the forks, 114, 116, an angle at which the forks 114, 116 enter the opening(s) 118 of the platform 106, etc.) based on a detected placement of the load 110 on the platform 106 to reduce a risk of the load 110 tipping during transport of the platform 106.

The example docking control circuitry 126 of FIG. 1 monitors the outputs of the sensor(s) 120, 122, 124 during the docking of the robotic vehicle 102 with the platform(s) 106, 108 to determine if adjustments to the positioning of the robotic vehicle 102 (e.g., the fork(s) 114, 116) relative to the platform(s) 106, 108 should be adjusted. In some examples, the docking control circuitry 126 determines if the docking event should be aborted based on sensor data generated during the docking event. As an example, the docking control circuitry 126 can determine based on the outputs of the sensor(s) 120 of the forks 114, 116 that a state of repair of the first platform 106 could result in damage to the platform(s) 106, 108, where such platform conditions were not otherwise detectable until the forks 114, 116 were at least partially inserted into the opening(s) 118 of the first platform 106. In examples, in which the docking control circuitry 126 determines that the docking event should be aborted, the docking control circuitry 126 can cause alerts to be output to inform a human operator.

The example docking control circuitry 126 of FIG. 1 can also generate instructions to cause the robotic vehicle 102 to perform maneuvers to disengage or uncouple from the platform 106, 108 after, for instance, transport of the platform 106, 108 to a particular location based on the properties of the platform(s) 106, 108; the load(s) 110, 112; and/or the environment 104. The docking control circuitry 126 can provide the sensor data and/or instructions generated during monitoring of the robotic vehicle 102 during docking, transport, and/or undocking of platform(s) 106, 108 for refinement and/or further training of the machine learning model(s). For example, if a load 110, 112 fell off of the robotic vehicle 102 during transportation, the docking control circuitry 126 can record the related data (e.g., load property, position of the forks 114, 116) for training of the machine learning model(s).

Figure 2:
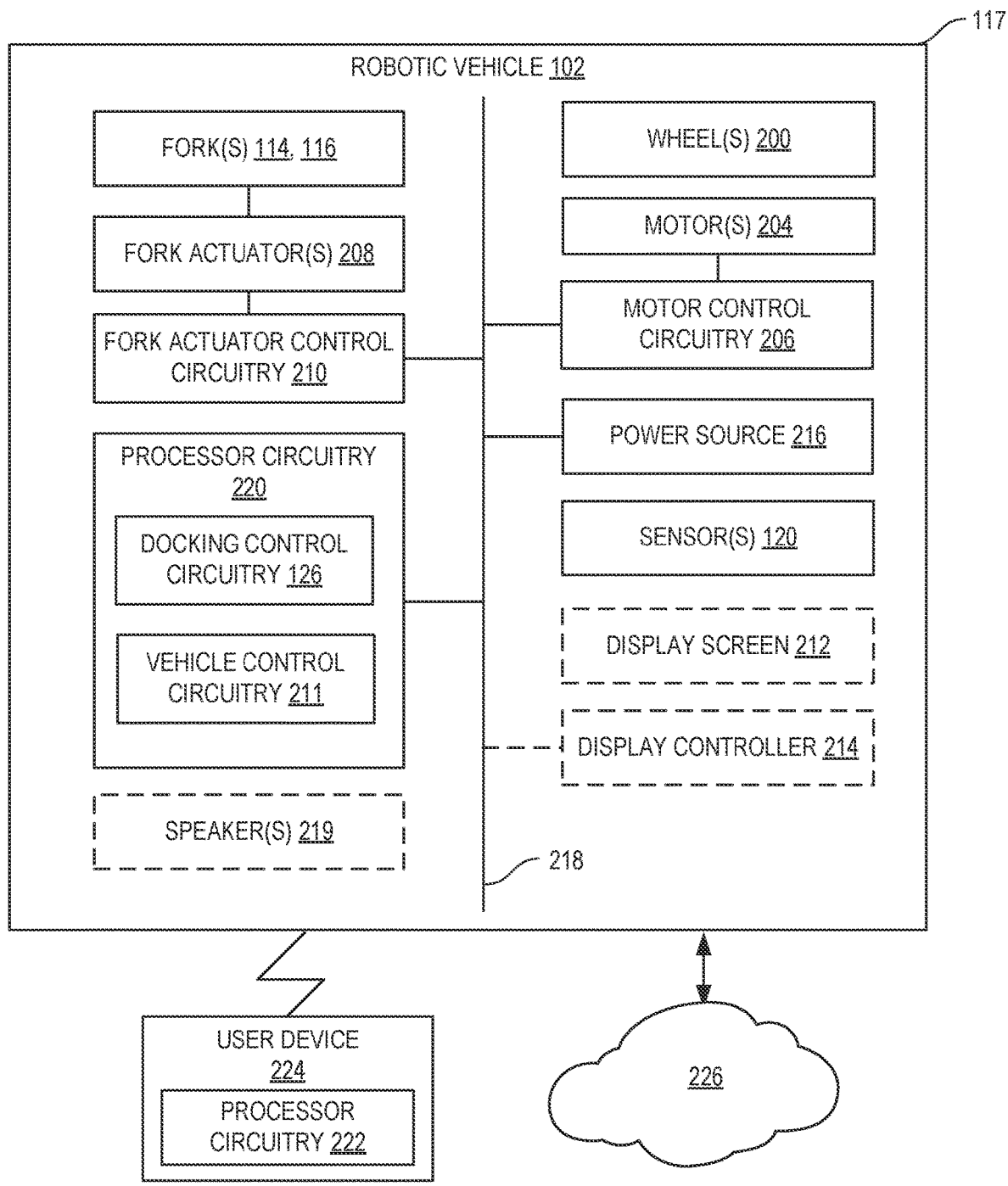
FIG. 2 illustrates an example system including the example robotic vehicle of FIG. 1 and example docking control circuitry in accordance with teachings of this disclosure

FIG. 2 illustrates the robotic vehicle 102 of the example system 100. The robotic vehicle 102 of FIG. 2 includes wheels 200 coupled to the body 117 of the robotic vehicle 102 to enable the robotic vehicle 102 to move to, for instance, transport the platform(s) 106, 108. The robotic vehicle 102 of FIG. 2 includes one or more motors 204 (e.g., electric motor(s) and/or other drive mechanism(s)) to cause movement of the robotic vehicle 102 via the wheel(s) 200 of the robotic vehicle 102. The robotic vehicle 102 includes motor control circuitry 206 (e.g., hardware and/or software components) to control, for example, a speed of the robotic vehicle 102.

The robotic vehicle 102 includes the fork(s) 114, 116 supported by the body 117 of the robotic vehicle 102. The robotic vehicle 102 includes one or more actuator(s) 208 to cause movement of the fork(s) 114, 116. The actuator(s) 208 can cause the fork(s) 114, 116 to extend relative to the body 117 to, for instance, enter the opening(s) 118 of the platforms 106, 108 or retract relative to the body 117 to disengage from the platform(s) 106, 108. The robotic vehicle 102 includes fork actuator control circuitry 210 (e.g., hardware and/or software components) to control actuation of the fork(s) 114, 116.

As disclosed herein, the robotic vehicle 102 can include an autonomous vehicle. The robotic vehicle 102 includes vehicle control circuitry 211 to control movement of the autonomous or self-driving robotic vehicle 102. In the example of FIG. 2, the vehicle control circuitry 211 is implemented by processor circuitry 220 of the robotic vehicle 102. The robotic vehicle 102 moves to a location in the environment 104 without or with limited user input control during movement of the vehicle 102.

The example robotic vehicle 102 of FIG. 2 includes the sensor(s) 120. The sensor(s) 120 can include, for instance, image sensor(s), force sensor(s), weight sensor(s), proximity sensor(s), infrared sensor(s), LIDAR sensor(s), etc. As disclosed herein, the robotic vehicle sensor(s) 120 output signals corresponding to data that can be used to evaluate whether the robotic vehicle 102 should dock or attempt to dock with the platform(s) 106, 108.

In some examples, the robotic vehicle 102 includes a display screen 212 to present data to user(s) of the robotic vehicle 102. In such examples, a display controller 214 (e.g., a graphics processing unit (GPU)) of the example robotic vehicle 102 of FIG. 2 controls operation of the display screen 212 and facilitates rendering of content (e.g., display frame(s) associated with graphical user interface(s)) via the display screen 212. The example robotic vehicle 102 of FIG. 2 includes a power source 216 such as a battery to provide power to the components of the robotic vehicle 102 communicatively coupled via a bus 218. In some examples, the robotic vehicle 102 includes speaker(s) 219 to provide audio output(s) to user(s) interacting with the robotic vehicle 102.

In the example of FIG. 2, the docking control circuitry 126 of FIG. 1 is implemented by executable instructions executed on the processor circuitry 220 of the robotic vehicle 102. However, in other examples, the docking control circuitry 126 is implemented by processor circuitry 222 of another user device 224 (e.g., a smartphone, an edge device, a wearable device, etc.) in communication with the robotic vehicle 102 (e.g., via wired or wireless communication protocols), and/or by a cloud-based device 226 (e.g., one or more server(s), processor(s), and/or virtual machine(s)). In other examples, one or more components of the docking control circuitry 126 is implemented by dedicated circuitry located on the robotic vehicle 102 and/or the user device 224. These components may be implemented in software, hardware, or in any combination of two or more of software, firmware, and/or hardware. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Figure 3:
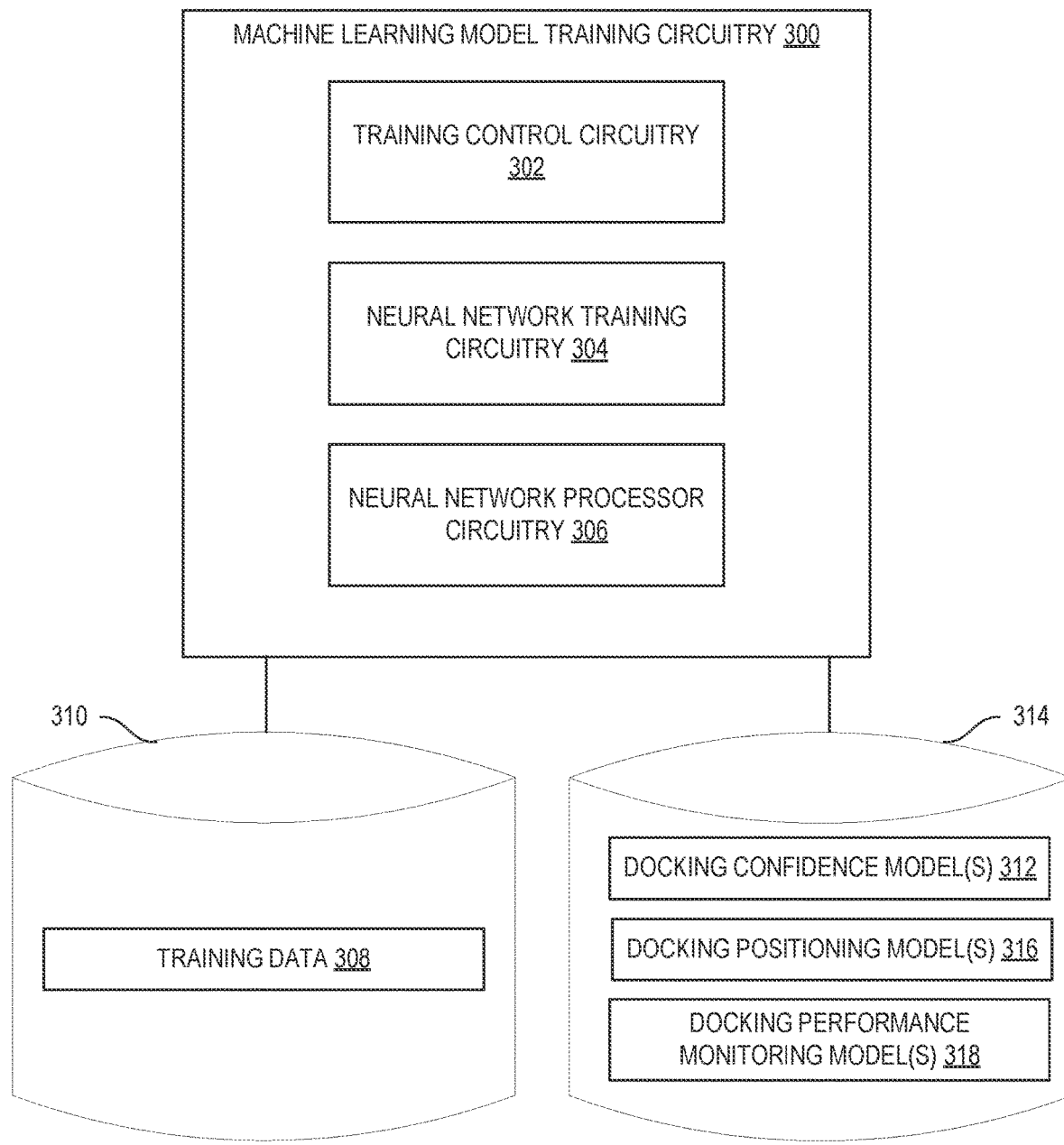
FIG. 3 is a block diagram of example machine learning model training circuitry.

FIG. 3 is a block diagram of machine learning model training circuitry 300 to train machine learning model(s) that are to be executed by the docking control circuitry 126 to determine if the robotic vehicle 102 should dock with the platform(s) 106, 108 and to control or guide the robotic vehicle 102 in engaging with and/or transporting the platform(s) 106, 108 when the docking control circuitry 126 determines that the docking event should occur. The machine learning model training circuitry 300 of FIG. 3 may be instantiated (e.g., creating an instance of, bring into being for any length of time, materialize, implement, etc.) by processor circuitry such as a central processing unit executing instructions. Additionally or alternatively, the machine learning model training circuitry 300 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The example machine learning model training circuitry 300 of FIG. 3 includes training control circuitry 302, neural network training circuitry 304, and neural network processor circuitry 306. In some examples, the training control circuitry 302 is instantiated by processor circuitry executing training control instructions and/or configured to perform operations such as those represented by the flowchart of FIG. 5. In some examples, the neural network training circuitry 304 is instantiated by processor circuitry executing training control instructions and/or configured to perform operations such as those represented by the flowchart of FIG. 5.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, training is performed either remotely (e.g., in a cloud or at a server) or locally (e.g., at the robotic vehicle 102). Training is performed using hyperparameters that control how the learning is performed (e.g., a learning rate, a number of layers to be used in the machine learning model, etc.). Training is performed using training data. In examples disclosed herein, the training data originates from, for instance, the robotic vehicle 102, other robotic vehicles, other types of vehicles (e.g., manually operated vehicles), sensors carried by the vehicle(s), sensor(s) carried by the platform(s) (e.g., the platform(s) 106, 108 or other platform(s)), and/or sensor(s) located in the environment (e.g., the environment 104, other environments), etc. When supervised training is used, the training data is labeled. In some examples, the training data is pre-processed. In some examples re-training may be performed. Such re-training may be performed in response to, for example, data collected by the robotic vehicle 102 during docking, transporting, and/or undocking from the platform(s) 106, 108.

Once training is complete, the model is deployed for use as an executable construct that processes an input and provides an output based on the network of nodes and connections defined in the model. The model is stored locally in memory (e.g., temporarily stored in a cache and moved into (e.g., main) memory after training) or may be stored in the cloud. The model may then be executed by the docking control circuitry 126.

Once trained, the deployed model may be operated in an inference phase to process data. In the inference phase, data to be analyzed (e.g., live data) is input to the model, and the model executes to create an output. This inference phase can be thought of as executing the model to apply the learned patterns and/or associations to the live data. In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In examples disclosed herein, the neural network processor circuitry 306 of FIG. 3 implements one or more neural networks. The example neural network training circuitry 304 of FIG. 3 performs training of the neural network(s) implemented by the neural network processor circuitry 306. In some examples disclosed herein, training is performed using a stochastic gradient descent algorithm. However, other approaches to training a neural network(s) may additionally or alternatively be used.

The example training control circuitry 302 of FIG. 3 instructs the neural network training circuitry 304 to perform training of the neural network(s) using training data 308. In the example of FIG. 3, the training data 308 is used by the neural network training circuitry 304 to train the neural network(s) is stored in a database 310.

In the example of FIG. 3, the training data 308 can include, for example, images (e.g., two-dimensional and/or three-dimensional images) of platforms (e.g., pallets) having different properties such as size, shape, weight, state of repair, material(s) of the platform and/or material(s) surrounding the platform such as wrapping, etc. The training data 308 can include images of platforms in different orientations and/or in different locations, such as resting on a floor, on a truck bed, partially surrounded by obstructions (e.g., other platforms, equipment, a wall, etc.). The training data 308 can be based on sensor data (e.g., image data, position data, weight data) generated during operation of a manual or user-controlled vehicle (e.g., a forklift driven by an operator) and/or during operation of the robotic vehicle 102 or other robotic vehicles (e.g., other autonomous vehicles).

The training data 308 can include images of vehicles (e.g., manually operated forklifts, the robotic vehicle 102, other robotic vehicles) performing maneuvers to engage with, lift, and/or carry platforms of different sizes, shapes, states of repair, orientations, locations, etc. The training data 308 can include sensor data associated with performance of successful, preferred, and/or safe docking and undocking operations by manually operated vehicles and/or robotic vehicles. The training data 308 can include sensor data associated with unsuccessful, unpreferred, and/or unsafe docking and undocking operations performed by manually operated vehicles and/or robotic vehicles, such as instances in which the platform, the load carried by the platform, and/or the vehicle was damaged. The sensor data associated with the successful and/or unsuccessful operations can include sensor outputs generated before, during, and/or after engagement with the platform.

In some examples, the training data 308 includes data captured while a user is docking a vehicle such as a fork truck with a platform in a manual mode (i.e., the user is operating the vehicle, providing inputs at the vehicle to position the forks relative to the platform, etc.). In such examples, the training data 308 can include, for example, images (e.g., video frames) of the vehicle docking with the platform while being operated by the user, outputs of sensors (e.g., force sensors, proximity sensors) of the vehicle during performance of the operator-controlled docking maneuvers, etc. The training data 308 can include examples of successful manually controlled docking events and unsuccessful manually controlled docking events. The training data 308 can also include data captured during manually controlled undocking events.

The training data 308 can be labeled to indicate a type of docking or undocking operation (e.g., successful, preferred, and/or safe docking and undocking operations; unsuccessful, unpreferred, and/or unsafe docking and undocking operations). For instance, the training data 308 includes labels indicating whether or not the platform is in a condition to be lifted by a vehicle, whether a particular type of robotic vehicle can carry the platform (e.g., based on weight limitations, fork style of the vehicle), whether the platform is in a location that permits the platform to be lifted, whether the docking operation is associated with a successful or unsuccessful docking operation, etc.

The neural network training circuitry 304 trains the neural network(s) implemented by the neural network processor circuitry 306 using the training data 308. For instance, the neural network training circuitry 304 trains the neural network(s) to determine (e.g., predict) a confidence or likelihood of a robotic vehicle (e.g., the robotic vehicle 102) being able to dock with and/or carry a platform (e.g., the platform 106, 108) without, for instance, causing damage or substantial damage to the platform, the load carried by the platform, and/or the robotic vehicle. The properties of the platform, the load, and/or the environment can be used as weights in training the neural network model to generate the confidence predictions. One or more docking confidence models 312 are generated as a result of the neural network training. The docking confidence model(s) 312 are stored in a database 314. The databases 310, 314 may be the same storage device or different storage devices.

In the example of FIG. 3, the neural network training circuitry 304 trains the neural network(s) to guide a robotic vehicle (e.g., the robotic vehicle 102) with respect to positioning and moving the body of the vehicle and/or the forks of the vehicle (e.g., the forks 114, 116) to couple with, lift, and carry the platform based on properties associated with the platform, the load, and/or the environment. One or more docking positioning models 316 are generated as a result of the neural network training. The docking positioning model(s) 316 are stored in the database 314.

In some examples, the neural network training circuitry 304 trains the neural network(s) to identify potential risk(s) of damage or substantial damage to the platform, the load, and/or the robotic vehicle while the robotic vehicle is engaging with or engaged with the platform. For example, the neural network training circuitry 304 can trains the neural network(s) to identify when a weight distribution of the load while the platform is being transported by the robotic vehicle is likely to result in the load falling off the platform (e.g., because the load is overhanging the forks). One or more docking performance models 318 are generated as a result of the neural network training. The docking performance model(s) 318 are stored in the database 314. As disclosed herein, the docking confidence model(s) 312, the docking positioning model(s) 316, and/or the docking performance monitoring model(s) 318 are executed by the docking control circuitry 126 to manage platform docking event(s) with respect to the robotic vehicle 102 of FIGS. 1 and 2.

While an example manner of implementing the machine learning model training circuitry 300 is illustrated in FIG. 3, one or more of the elements, processes, and/or devices illustrated in FIG. 3 may be combined, divided, re-arranged, omitted, eliminated, and/or implemented in any other way. Further, the example training control circuitry 302, the example neural network training circuitry 304, the example neural network processor circuitry 306, and/or, more generally, the example machine learning model training circuitry 300, may be implemented by hardware alone or by hardware in combination with software and/or firmware. Thus, for example, any of the example training control circuitry 302, the example neural network training circuitry 304, the example neural network processor circuitry 306, and/or, more generally, the example machine learning model training circuitry 300, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example machine learning model training circuitry 300 may include one or more elements, processes, and/or devices in addition to, or instead of, those illustrated in FIG. 3, and/or may include more than one of any or all of the illustrated elements, processes, and devices.

Figure 4:
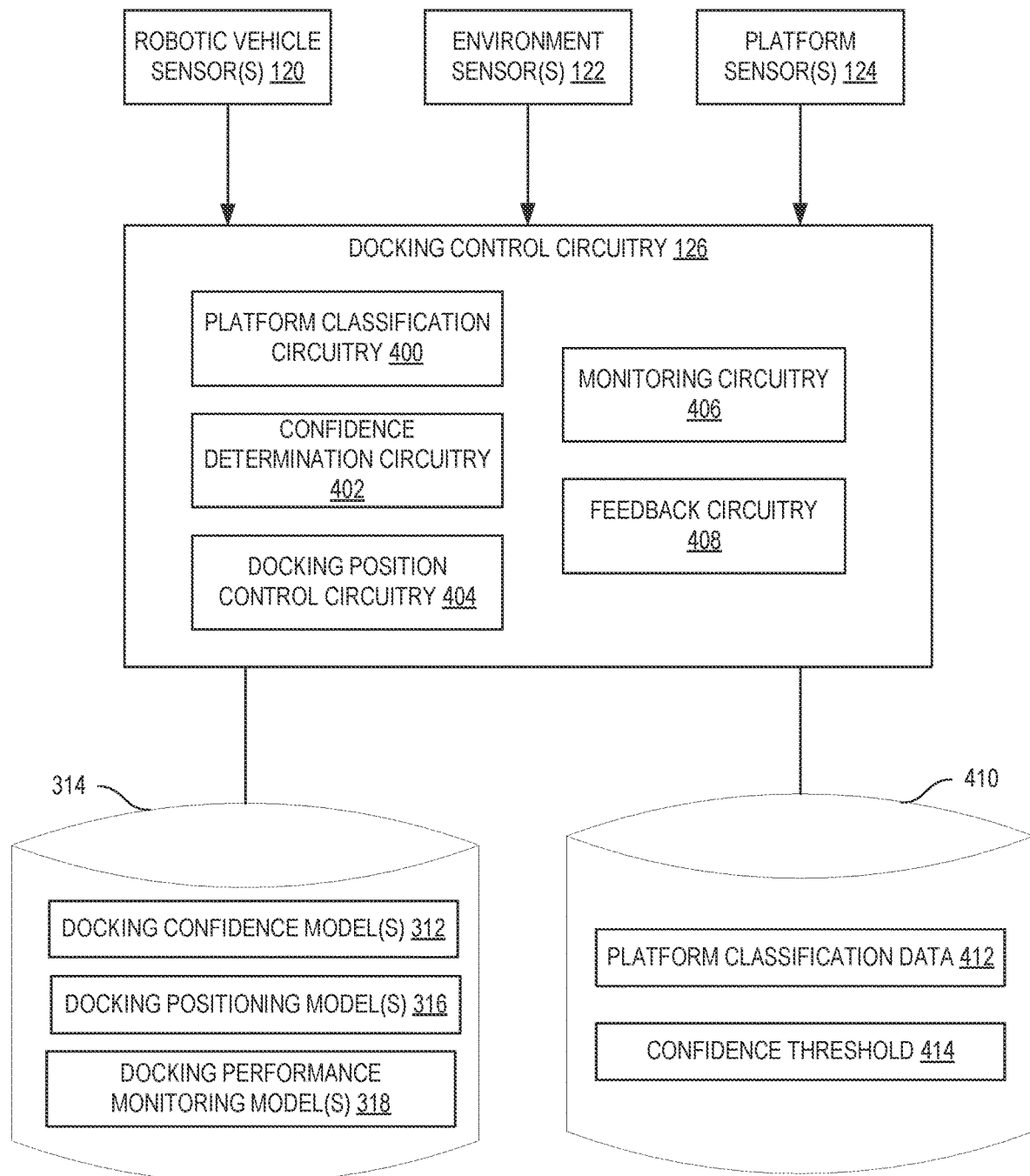
FIG. 4 is a block diagram of the example docking control circuitry.

FIG. 4 is a block diagram of the example docking control circuitry 126 of FIGS. 1 and 2 to execute machine learning model(s) to selectively determine whether a robotic vehicle (e.g., the robotic vehicle 102 of FIGS. 1 and 2) should initiate a docking event with a platform (e.g., a pallet) to transport the platform and to guide the robotic vehicle with respect to engaging with (e.g., coupling to, interfacing with) the platform. The docking control circuitry 126 of FIG. 4 may be instantiated (e.g., creating an instance of, bring into being for any length of time, materialize, implement, etc.) by processor circuitry such as a central processing unit executing instructions. Additionally or alternatively, the docking control circuitry 126 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

The example docking control circuitry 126 of FIG. 4 includes platform classification circuitry 400, confidence determination circuitry 402, docking position control circuitry 404, monitoring circuitry 406, and feedback circuitry 408. In some examples, the platform classification circuitry 400 is instantiated by processor circuitry executing platform classification instructions and/or configured to perform operations such as those represented by the flowchart of FIG. 6. In some examples, the confidence determination circuitry 402 is instantiated by processor circuitry executing confidence determination instructions and/or configured to perform operations such as those represented by the flowchart of FIG. 6. In some examples, the docking position control circuitry 404 is instantiated by processor circuitry executing docking position control instructions and/or configured to perform operations such as those represented by the flowchart of FIG. 6. In some examples, the monitoring circuitry 406 is instantiated by processor circuitry executing monitoring instructions and/or configured to perform operations such as those represented by the flowchart of FIG. 6. In some examples, the feedback circuitry 408 is instantiated by processor circuitry executing feedback instructions and/or configured to perform operations such as those represented by the flowchart of FIG. 6.

The example platform classification circuitry 400 of FIG. 4 identifies or classifies the platform 106, 108 that is a candidate for docking with the robotic vehicle 102. The candidate platform 106, 108 can be a platform to which the robotic vehicle 102 has been requested, instructed, or assigned to transport. The example platform classification circuitry 400 of FIG. 4 accesses sensor data (e.g., image data, weight data, proximity data) corresponding to the outputs of the robotic vehicle sensor(s) 120, the environment sensor(s) 122, and/or the platform sensor(s) 124. The platform classification circuitry 400 analyzes (e.g., recognizes) properties of the candidate platform 106, 108, the load 110, 112 carried by the platform 106, 108, and/or the environment 104 based on the sensor outputs.

For example, the platform classification circuitry 400 can perform image analysis to identify or recognize the platform 106, 108 that the robotic vehicle 102 has been assigned to transport (e.g., carry, move). The platform classification circuitry 400 analyzes the sensor data to identify (e.g., predict, recognize) properties of the selected platform 106, 108 such as a size, a shape, material(s), etc. of the platform 106, 108. In some examples, the platform classification circuitry 400 identifies (e.g., predicts, recognizes) properties of the load 110, 112 carried by the platform 106, 108 based on analysis of the sensor data, such as a size of the load 110, 112, a weight of the load 110, 112, load type based on image analysis of barcodes or labels on the load 110, 112, etc. In some examples, the platform classification circuitry 400 identifies a location and/or an orientation of the platform 106, 108 in the environment 104 based on the sensor data. In some examples, the platform classification circuitry 400 identifies hazards or obstacles in the environment 104 based on the sensor data. The platform classification circuitry 400 stores the properties of the platform 106, 108, the load 110, 112, and/or the environment 104 in a database 410 as platform classification data 412. In some examples, the docking control circuitry 126 includes the database 410. In some examples, the database 410 is located external to the docking control circuitry 126 in a location accessible to the docking control circuitry 126 as shown in FIG. 4.

The example confidence determination circuitry 402 executes the docking confidence model(s) 312 to predict a likelihood that the robotic vehicle 102 will be able to dock with and/or carry (e.g., transport) the platform 106, 108 without, for instance, causing damage or substantial damage to the platform 106, 108, the load 110, 112, and/or the robotic vehicle 102 based on the platform classifications 412 (e.g., platform type, load size, platform orientation, platform location in the environment 104, obstacles in the environment 104, etc.). The confidence determination circuitry 402 can access the docking confidence model(s) 312 from the database 314. The databases 314, 410 may be the same storage device or different storage devices.

As a result of execution of the docking confidence model(s) 312, the confidence determination circuitry 402 assigns a confidence level to the candidate platform 106, 108 indicating a likelihood of the robotic vehicle 102 docking with and/or carrying the platform 106, 108 without damage or substantial damage to the platform 106, 108, the load 110, 112, or the robotic vehicle 102. The platform classification data 412 can serve as weight(s) that affect the confidence level when executing the docking confidence model(s) 312. For instance, a platform that is wider than the robotic vehicle 102 may decrease the confidence level, while a platform that is smaller than the robotic vehicle can increase the confidence level. As another example, a higher confidence level may result when the platform 106, 108 is alone in the environment, while the platform 106, 108 disposed between two other pallets or between a wall and another pallet can decrease the confidence determination.

The confidence determination circuitry 402 determines whether the confidence level satisfies a confidence threshold 414. The confidence threshold 414 can be defined based on user input(s) and stored in the database 410. If the confidence level satisfies the confidence threshold 414, the confidence determination circuitry 402 outputs instructions indicating that the robotic vehicle 102 should initiate a docking event with (e.g., retrieve) the platform 106, 108. For instance, the confidence determination circuitry 402 can communicate with the vehicle control circuitry 211 and/or the motor control circuitry 206 (FIG. 2) of the robotic vehicle 102 to cause the robotic vehicle 102 to move to a location including the platform 106, 108.

If the confidence level does not satisfy the confidence threshold 414, the confidence determination circuitry 402 refrains from outputting instructions to cause the robotic vehicle 102 to engage with the platform 106, 108. In some such examples, the confidence determination circuitry 402 causes alert(s) to be output (e.g., via the display screen 212 and/or the speakers 219 of the robotic vehicle 102) to indicate that an operator (i.e., a human) should assist with the retrieval of the platform 106, 108 (e.g., by manually operating the robotic vehicle 102). In some examples, a user can override the alert(s) to cause the robotic vehicle 102 to dock with the platform 106, 108.

In examples in which the confidence determination circuitry 402 determines that the confidence level satisfies the confidence threshold 414 and, thus, the robotic vehicle 102 should engage with the platform 106, 108, the docking position control circuitry 404 executes the docking positioning model(s) 316 to cause the robotic vehicle 102 to perform one or more positioning maneuvers to engage the platform 106, 108. In particular, the docking position control circuitry 404 executes the docking positioning model(s) 316 to determine, identify, or select maneuvers for the robotic vehicle 102 to perform to engage the platform 106, 108 based on the platform classification data 412.

For example, as a result of execution of the docking positioning model(s) 316, the docking position control circuitry 404 can determine whether the robotic vehicle 102 should move the forks 114, 116 up, down, to the left/right, etc. based on an orientation, size, and/or shape of the platform 106, 108. As a result of execution of the docking positioning model(s) 316, the docking position control circuitry 404 can determine whether the robotic vehicle 102 should adjust a width between the forks 114, 116; adjust an angle at which the forks 114, 116 should engage the platform 106, 108; and/or engage a particular side of the platform 106, 108 based on the type of platform, the orientation of the platform 106, 108, obstructions in the environment 104 proximate to the platform 106, 108, etc. The docking position control circuitry 404 can determine particular maneuvers to position the forks 114, 116 relative to platform 106, 108 based on a weight of the load 110, 112. For example, the docking position control circuitry 404 can determine that the forks 114, 116 should be separated a first amount to support a first load weight and separated a second amount to support a second load weight different from the first load weight.

The docking position control circuitry 404 outputs instructions to cause the robotic vehicle 102 to perform the maneuvers. For instance, the docking position control circuitry 404 can output instructions to be implemented by the fork actuator control circuitry 210 to cause the fork actuators 208 to move the fork(s) 114, 116 based on the instructions.

In some examples, the docking position control circuitry 404 executes the docking positioning model(s) 316 to cause the robotic vehicle 102 to perform maneuver(s) to disengage or undock from the platform 106, 108. For instance, the vehicle control circuitry 211 (FIG. 2) of the robotic vehicle 102 can indicate to the docking position control circuitry 404 that the robotic vehicle 102 has arrived at the destination for the platform 106, 108. In response, the docking position control circuitry 404 can execute the docking positioning model(s) 316 to cause the robotic vehicle 102 to disengage from the platform 106, 108 at the destination. As a result of execution of the docking positioning model(s) 316 in view of the platform classification data 412, the undocking maneuvers are based on factors such as, for example, platform type, weight distribution of the load 110, 112, etc. Thus, the docking position control circuitry 404 can identify positioning maneuvers for disengaging with the platform 106, 108 that prevents damage or substantial damage to the platform 106, 108, the load 110, 112, or the robotic vehicle 102.

The example monitoring circuitry 406 of FIG. 4 analyzes outputs of the sensor(s) 120, 122, 124 while the robotic vehicle 102 is engaging or is engaged with the platform 106, 108. Based on the data corresponding to the outputs of the sensor(s) 120, 122, 124, the monitoring circuitry 406 determines if, for instance, changes to the positioning maneuvers should be implemented by the robotic vehicle 102 or if the docking event should be aborted. For example, as disclosed herein, the fork(s) 114, 116 of the robotic vehicle 102 can include sensor(s) 120 that output images of the surface 109, 111 of the platform 106, 108 when the fork(s) 114, 116 are at least partially disposed in the opening(s) 118 of the platform 106, 108. The monitoring circuitry 406 can analyze the image data to determine if one or more portions of the surface 109, 111 show signs of wear, if there are obstructions at the platform 106, 108 such as materials disposed between (e.g., hanging between) slots of the platform 106, 108, etc. In some such examples, the monitoring circuitry 406 communicates with docking position control circuitry 404 to cause the robotic vehicle 102 to, for instance, reposition the fork(s) 114, 116 relative to the platform 106, 108 so that the fork(s) 114, 116 do not engage the worn portion(s) of the platform surface 109, 111. In some such examples, the monitoring circuitry 406 outputs instructions to cause the robotic vehicle 102 to disengage from the platform 106, 108 and abort the docking effort if, for instance, the monitoring circuitry 406 predicts that the load 110, 112 could be damaged if the fork(s) 114, 116 engage the platform surface 109, 111 due to the state of repair of the platform 106, 108.

The monitoring circuitry 406 executes the docking performance monitoring model(s) 318 to identify the potential risk of damage to the platform 106, 108, the load 110, 112, and/or the robotic vehicle 102 while the robotic vehicle 102 is engaging or is engaged with the platform 106, 108. For example, based on data corresponding to the outputs by the sensor(s) 120, 122, 124 (e.g., force data, image data) and execution of the docking performance monitoring model(s) 318, the monitoring circuitry 406 can identify an orientation of the platform 106, 108 when the platform 106, 108 is carried by the forks 114, 116. As a result of execution of the docking performance monitoring model(s) 318, the monitoring circuitry 406 can recognize that the forks 114, 116 engaged the platform 106, 108 such that the platform 106, 108 is overhanging the forks 114, 116 by an amount that could cause the platform 106, 108 to fall during transportation or in another orientation that could affect the ability of the robotic vehicle 102 to carry the platform 106, 108. In some examples, the monitoring circuitry 406 recognizes that the forks 114, 116 are crooked and, thus, the platform 106, 108 is tilted. In some such examples, the monitoring circuitry 406 outputs instruction(s) for the robotic vehicle 102 to disengage from the platform 106, 108. For instance, the monitoring circuitry 406 communicates with docking position control circuitry 404 to cause the robotic vehicle 102 to return the platform 106, 108 to a ground surface, disengage from the platform 106, 108, and perform adjusted maneuvers to re-engage with the platform 106, 108 to prevent or minimize a risk of the load 110, 112 falling during transport.

In some examples, the monitoring circuitry 406 causes alert(s) to be output (e.g., via the display screen 212 and/or the speakers 219 of the robotic vehicle 102) to inform an operator of the performance of the robotic vehicle 102 with respect to docking and/or carrying the platform 106, 108. In some examples, a user can override the alert(s) to cause the robotic vehicle 102 to continue to transport the platform 106, 108.

The feedback circuitry 408 communicates with the machine learning model training circuitry 300 of FIG. 3 to facilitate training, re-training, and/or refining of the docking confidence model(s) 312, the docking positioning model(s) 316, and/or the docking performance monitoring model(s) 318 based on data collected during docking event(s) performed by the robotic vehicle 102. The feedback circuitry 408 can provide data associated with, for instance, the positioning of the forks 114, 116 prior to engagement with the platform 106, 108 and re-positioning of the forks 114, 116 during docking, for use in refining and/or re-training the machine learning model(s) 312, 316, 318. For example, the feedback circuitry 408 can communicate with the machine learning model training circuitry 300 to inform the machine learning model training circuitry 300 that a certain way for lifting the platform 106 that was previously associated with the docking positioning model(s) 316 resulted in damage to the platform 106, 108 and/or the load 110, 112. As such, the machine learning model training circuitry 300 can re-train the docking performance model(s) 318 so that the robotic vehicle 102 does not pick up other platform(s) and/or load(s) having similar properties as the platform and/or load that sustained damage in the same way.

In some examples, the docking control circuitry 126 includes means for classifying. For example, the means for classifying may be implemented by the platform classification circuitry 400. In some examples, the platform classification circuitry 400 may be instantiated by processor circuitry such as the example processor circuitry 812 of FIG. 8. For instance, the platform classification circuitry 400 may be instantiated by the example microprocessor 900 of FIG. 9 executing machine executable instructions such as those implemented by at least blocks 602, 624 of FIG. 6. In some examples, the platform classification circuitry 400 may be instantiated by hardware logic circuitry, which may be implemented by an ASIC, XPU, or the FPGA circuitry 1000 of FIG. 10 structured to perform operations corresponding to the machine readable instructions. Additionally or alternatively, the platform classification circuitry 400 may be instantiated by any other combination of hardware, software, and/or firmware. For example, the platform classification circuitry 400 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the docking control circuitry 126 includes means for confidence determining. For example, the means for confidence determining may be implemented by the confidence determination circuitry 402. In some examples, the confidence determination circuitry 402 may be instantiated by processor circuitry such as the example processor circuitry 812 of FIG. 8. For instance, the confidence determination circuitry 402 may be instantiated by the example microprocessor 900 of FIG. 9 executing machine executable instructions such as those implemented by at least blocks 604, 606 of FIG. 6. In some examples, the confidence determination circuitry 402 may be instantiated by hardware logic circuitry, which may be implemented by an ASIC, XPU, or the FPGA circuitry 1000 of FIG. 10 structured to perform operations corresponding to the machine readable instructions. Additionally or alternatively, the confidence determination circuitry 402 may be instantiated by any other combination of hardware, software, and/or firmware. For example, the confidence determination circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the docking control circuitry 126 includes means for position controlling. For example, the means for position controlling may be implemented by the docking position control circuitry 404. In some examples, the docking position control circuitry 404 may be instantiated by processor circuitry such as the example processor circuitry 812 of FIG. 8. For instance, the docking position control circuitry 404 may be instantiated by the example microprocessor 900 of FIG. 9 executing machine executable instructions such as those implemented by at least blocks 608, 612, 616, 618, 620 of FIG. 6. In some examples, the docking position control circuitry 404 may be instantiated by hardware logic circuitry, which may be implemented by an ASIC, XPU, or the FPGA circuitry 1000 of FIG. 10 structured to perform operations corresponding to the machine readable instructions. Additionally or alternatively, the docking position control circuitry 404 may be instantiated by any other combination of hardware, software, and/or firmware. For example, the docking position control circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the docking control circuitry 126 includes means for monitoring. For example, the means for monitoring may be implemented by the monitoring circuitry 406. In some examples, the monitoring circuitry 406 may be instantiated by processor circuitry such as the example processor circuitry 812 of FIG. 8. For instance, the monitoring circuitry 406 may be instantiated by the example microprocessor 900 of FIG. 9 executing machine executable instructions such as those implemented by at least block 610, 614 of FIG. 6. In some examples, the monitoring circuitry 406 may be instantiated by hardware logic circuitry, which may be implemented by an ASIC, XPU, or the FPGA circuitry 1000 of FIG. 10 structured to perform operations corresponding to the machine readable instructions. Additionally or alternatively, the monitoring circuitry 406 may be instantiated by any other combination of hardware, software, and/or firmware. For example, the monitoring circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the docking control circuitry 126 includes means for providing feedback. For example, the means for providing feedback may be implemented by the feedback circuitry 408. In some examples, the feedback circuitry 408 may be instantiated by processor circuitry such as the example processor circuitry 812 of FIG. 8. For instance, the feedback circuitry 408 may be instantiated by the example microprocessor 900 of FIG. 9 executing machine executable instructions such as those implemented by at least block 622 of FIG. 6. In some examples, the feedback circuitry 408 may be instantiated by hardware logic circuitry, which may be implemented by an ASIC, XPU, or the FPGA circuitry 1000 of FIG. 10 structured to perform operations corresponding to the machine readable instructions. Additionally or alternatively, the feedback circuitry 408 may be instantiated by any other combination of hardware, software, and/or firmware. For example, the feedback circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the docking control circuitry 126 of FIGS. 1 and 2 is illustrated in FIG. 3, one or more of the elements, processes, and/or devices illustrated in FIG. 3 may be combined, divided, re-arranged, omitted, eliminated, and/or implemented in any other way. Further, the example platform classification circuitry 400, the example confidence determination circuitry 402, the example docking position control circuitry 404, the example monitoring circuitry 406, the example feedback circuitry 408, and/or, more generally, the example docking control circuitry 126 of FIGS. 1 and 2, may be implemented by hardware alone or by hardware in combination with software and/or firmware. Thus, for example, any of the example platform classification circuitry 400, the example confidence determination circuitry 402, the example docking position control circuitry 404, the example monitoring circuitry 406, the example feedback circuitry 408, and/or, more generally, the example docking control circuitry 126, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example docking control circuitry 126 of FIGS. 1 and 2 may include one or more elements, processes, and/or devices in addition to, or instead of, those illustrated in FIG. 3, and/or may include more than one of any or all of the illustrated elements, processes, and devices.

Figure 5:
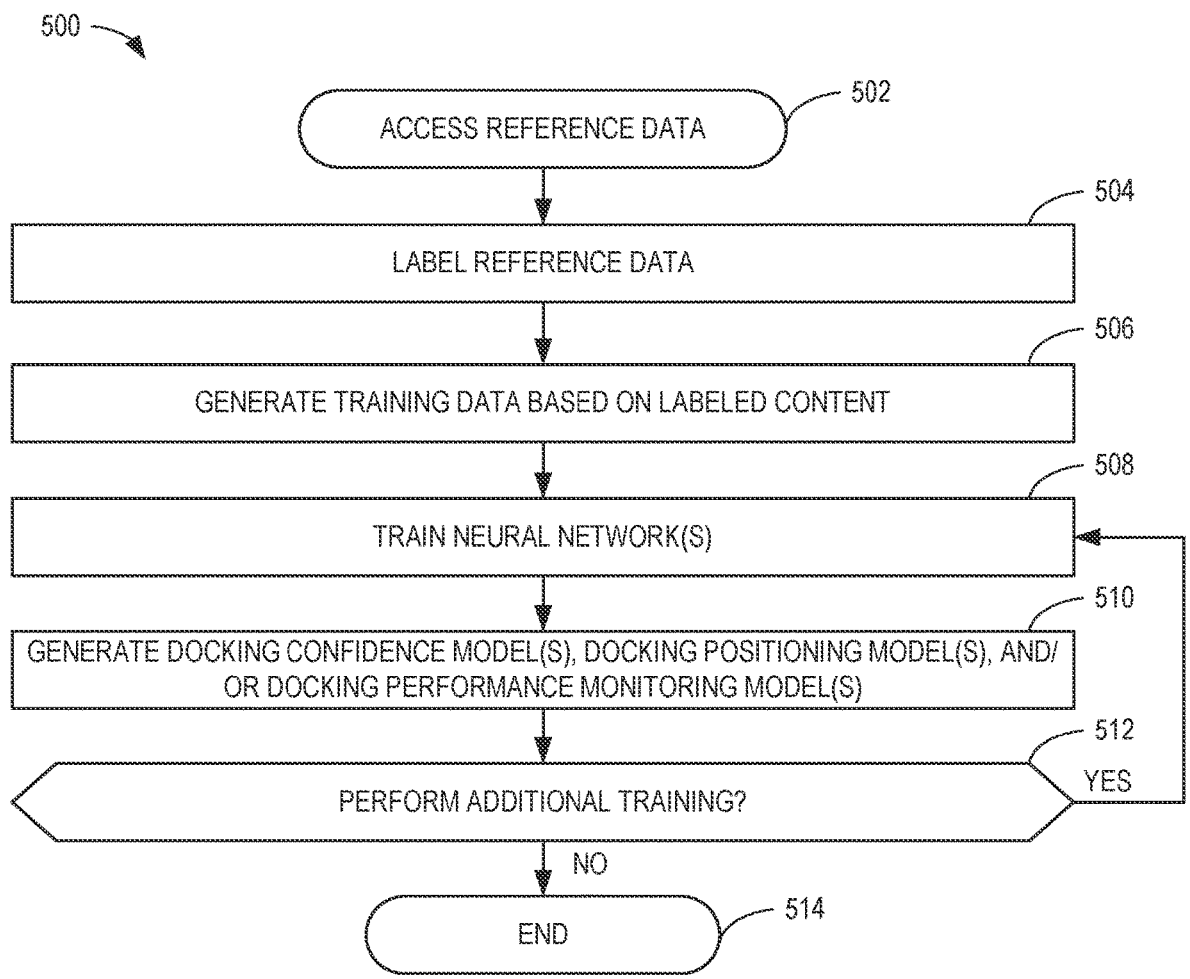
FIG. 5 is a flowchart representative of example machine readable instructions and/or example operations that may be executed by example processor circuitry to implement the machine learning training circuitry of FIG. 3.
Figure 6:
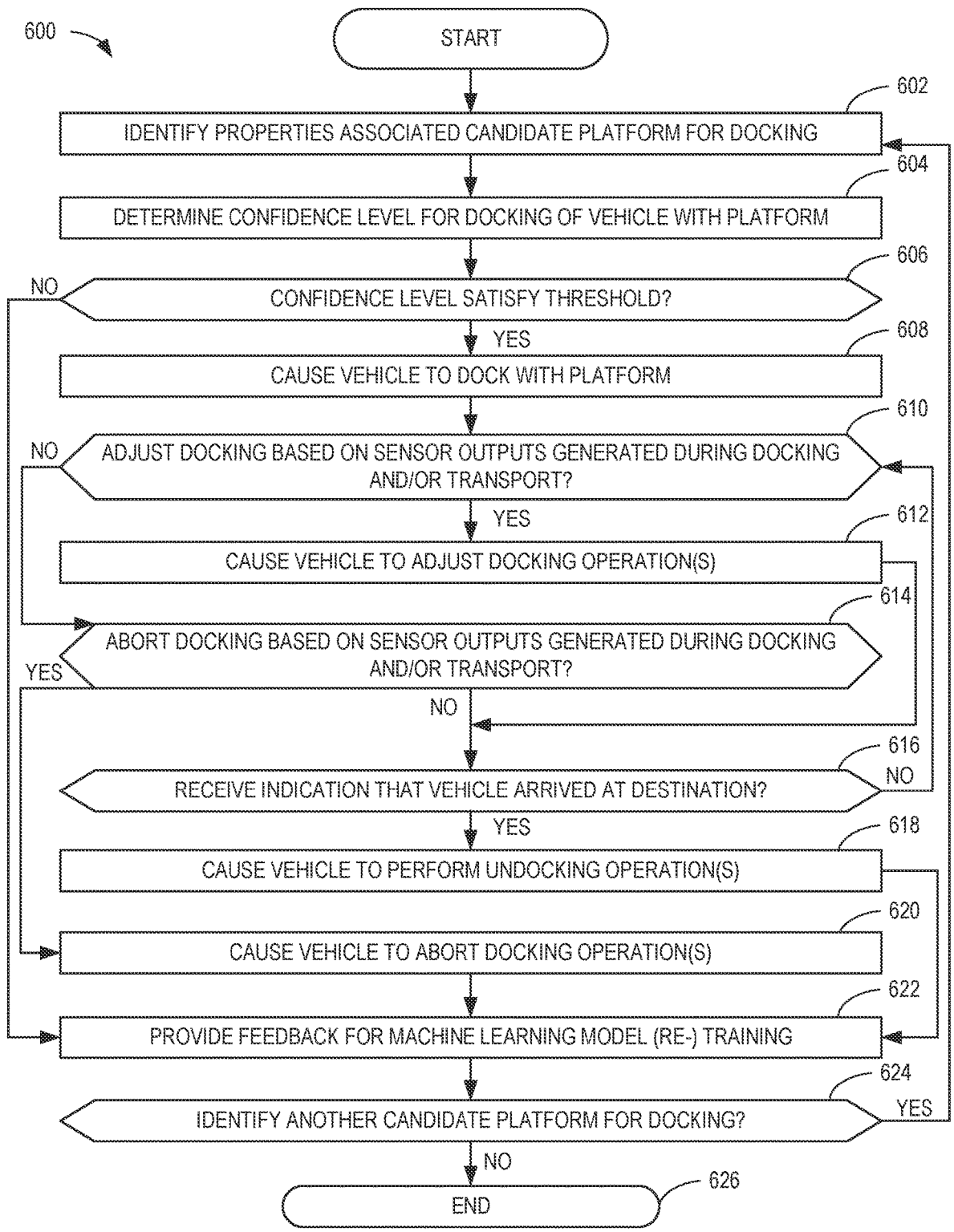
FIG. 6 is a flowchart representative of example machine readable instructions and/or example operations that may be executed by example processor circuitry to implement the docking control circuitry of FIG. 4.

A flowchart representative of example machine readable instructions, which may be executed to configure processor circuitry to implement the machine learning model training circuitry 300 of FIG. 3 is shown in FIG. 5. A flowchart representative of example machine readable instructions, which may be executed to configure processor circuitry to implement the docking control circuitry 126 of FIG. 4 is shown in FIG. 6. The machine readable instructions may be one or more executable programs or portion(s) of an executable program for execution by processor circuitry, such as the processor circuitry 712, 812 shown in the example processor platforms 700, 800 discussed below in connection with FIGS. 7 and 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5 and 6, many other methods of implementing the example machine learning model training circuitry 300 and/or the docking control circuitry 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5 and 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to train neural network(s) to manage docking of a robotic vehicle (e.g., the robotic vehicle 102 of FIGS. 1 and 2) with a platform (e.g., the platform(s) 106, 108, a pallet). The machine readable instructions and/or the operations 500 of FIG. 5 begin at block 502, at which the training control circuitry 302 accesses reference data. The reference data can include, for example, image data, force sensor data, proximity sensor data, etc. generated in connection with vehicles (e.g., robotic vehicles, autonomous vehicles, manually driven vehicles) performing operations including docking with or attempting to dock with platforms, lifting platforms, transporting platforms, etc., where the platforms can have different sizes, shapes, different loads, no loads, different orientations, different locations in an environment, etc.

At block 504, the training control circuitry 302 labels the reference data to identify, for instance, preferred, successful, and/or safe operations for docking with platforms based on properties of the platforms and/or the loads. The training control circuitry 302 can also label the reference data to identify, for instance, unpreferred, unsuccessful, and/or unsafe operations for docking with platforms based on the properties of the platforms and/or the loads. At block 506, the example training control circuitry 302 generates the training data 308 based on the labeled content.

At block 508, the training control circuitry 302 instructs the neural network training circuitry 304 to perform training of the neural network(s) implemented by the neural network processor circuitry 306. As a result of the training, the docking confidence model(s) 312, the docking positioning model(s) 316, and/or the docking performance model(s) 316 are generated at block 510. The example instructions 500 of FIG. 5 end when no additional training (e.g., re-training) is to be performed (blocks 512, 514).

FIG. 6 is a flowchart representative of example machine readable instructions and/or example operations 600 that may be executed and/or instantiated by processor circuitry to manage docking of a robotic vehicle (e.g., the robotic vehicle 102 of FIGS. 1 and 2) with a platform (e.g., the platform(s) 106, 108, a pallet). The machine readable instructions and/or the operations 600 of FIG. 6 begin at block 602, at which the platform classification circuitry 400 identifies properties associated with a candidate platform 106, 108 for docking with the robotic vehicle 102. The platform 106, 108 can include a platform 106, 108 to which the robotic vehicle 102 is assigned to transport. In the example of FIG. 6, the platform classification circuitry 400 identifies the properties based on sensor outputs from the sensor(s) 120 of the vehicle 102, the sensor(s) 122 in the environment 104 including the platform 106, 108 and/or the sensor(s) 124 of the platform 106, 108 to generate the platform classification data 412. The properties can include properties of the platform 106, 108 (e.g., size, shape, material), properties of the load 110, 112 carried by the platform, if any (e.g., type, placement on the platform 106, 108, weight); and/or properties of the environment 104 that can affect docking (e.g., platform location, other platforms and/or objects proximate to (e.g., adjacent, in contact with) the candidate platform 106, 108), etc.

At block 604, the confidence determination circuitry 402 executes the docking confidence model(s) 312 to determine a confidence level associated with a docking event between the robotic vehicle 102 and the candidate platform 106, 108 based on the platform classification data 412 for the particular platform 106, 108. At block 606, the confidence determination circuitry 402 determines if the confidence level satisfies the confidence threshold 414 such that a likelihood of docking between the robotic vehicle 102 and the platform 106, 108 will enable the vehicle 102 to engage with and carry the platform without causing damage or substantial damage to the platform 106, 108, the load 110, 112, and/or the vehicle 102.

In examples in which the confidence determination circuitry 402 determines that the confidence level satisfies the confidence threshold 414, the docking position control circuitry 404 executes the docking positioning model(s) 316 to cause or instruct (e.g., guide) the robotic vehicle 102 to engage or couple with the platform 106, 108 at block 608. For example, as a result of execution of the docking positioning model(s) 316 in view of the platform classification data 412, the docking position control circuitry 404 causes the robotic vehicle 102 to perform certain maneuvers to position the forks 114, 116 to engage with the platform 106, 108.

At block 610, the monitoring circuitry 406 monitors outputs of the sensor(s) 120, 122, 124 generated while the robotic vehicle 102 is engaging with (e.g., coupling with) or is engaged with (e.g., carrying) the platform 106, 108 to determine if adjustments to the docking operations should be performed. For instance, the monitoring circuitry 406 can determine that the docking operations (e.g., fork positioning maneuvers) should be adjusted based on force sensor outputs indicating that a weight associated with the platform 106, 108 is not balanced between the forks 114, 116 and, thus, likely to fall. At block 612, the docking position control circuitry 404 executes the docking positioning model(s) 316 to cause the robotic vehicle 102 to perform maneuvers to adjust docking operations with or to abort docking with the platform 106, 108.

In some examples, rather than adjusting the docking operations, the monitoring circuitry 406 determines that the docking operations should be aborted (block 614). The monitoring circuitry 406 can determine that the docking operations should be aborted based on, for example, image data illustrating a state of repair of the platform 106, 108 that may not have been otherwise visible until the forks 114, 116 at least partially entered the opening(s) 118 of the platform 106, 108. If the monitoring circuitry 406 determines that the docking operations should be aborted, control proceeds to block 620, at which the docking position control circuitry 404 executes the docking positioning model(s) 316 to cause the robotic vehicle 102 to abort the docking efforts (e.g., disengage from the platform 106, 108 without damaging or substantially damaging the platform 106, 108, the load 110, 112, or the robotic vehicle 102).

If the monitoring circuitry 406 does not identify adjustments to the docking operations, control proceeds to block 616, at which the docking position control circuitry 404 receives an indication from the vehicle control circuitry 211 that the robotic vehicle 102 has arrived at a destination for the platform 106, 108. Control also proceeds to block 616 after adjustments have been made to the docking operations. In response to the indication that the vehicle 102 has arrived at the destination, at block 618, the docking position control circuitry 404 executes the docking positioning model(s) 316 to cause the robotic vehicle 102 to perform maneuvers to undock or disengage from the platform 106, 108 without damaging or substantially damaging the platform 106, 108, the load 110, 112, or the robotic vehicle 102.

At block 622, the feedback circuitry 408 provides feedback for the machine learning model training circuitry 300 based on, for instance, data logged or recorded during docking events that were successful docking events (e.g., the platform was transported to the destination via the vehicle 102 without damage or substantial damage to the platform 106, 108, the load 110, or the vehicle 102) or unsuccessful docking events (e.g., the load fell off of the vehicle 102 during transport, the docking operations were aborted). For instance, the feedback circuitry 408 can provide data indicating position(s) of the fork(s) 114, 116 during the successful and/or unsuccessful docking events with the robotic vehicle 102 and corresponding platform classification data 412 for use in re-training the model(s) 312, 316, 318. In some embodiments, the feedback circuitry 408 may store data (e.g., from successful and/or unsuccessful docking events) and provide it to the machine learning model training circuitry 300 at a later time. Also, in examples in which the confidence determination circuitry 402 determines that the confidence level does not satisfy the threshold 414 (block 606), the feedback circuitry 408 can provide the corresponding platform classification data 412 for re-training of the model(s) 312, 316, 318. The example instructions 600 end when no further candidate platforms have been identified for docking with the robotic vehicle 102 (blocks 624, 626).

Figure 7:
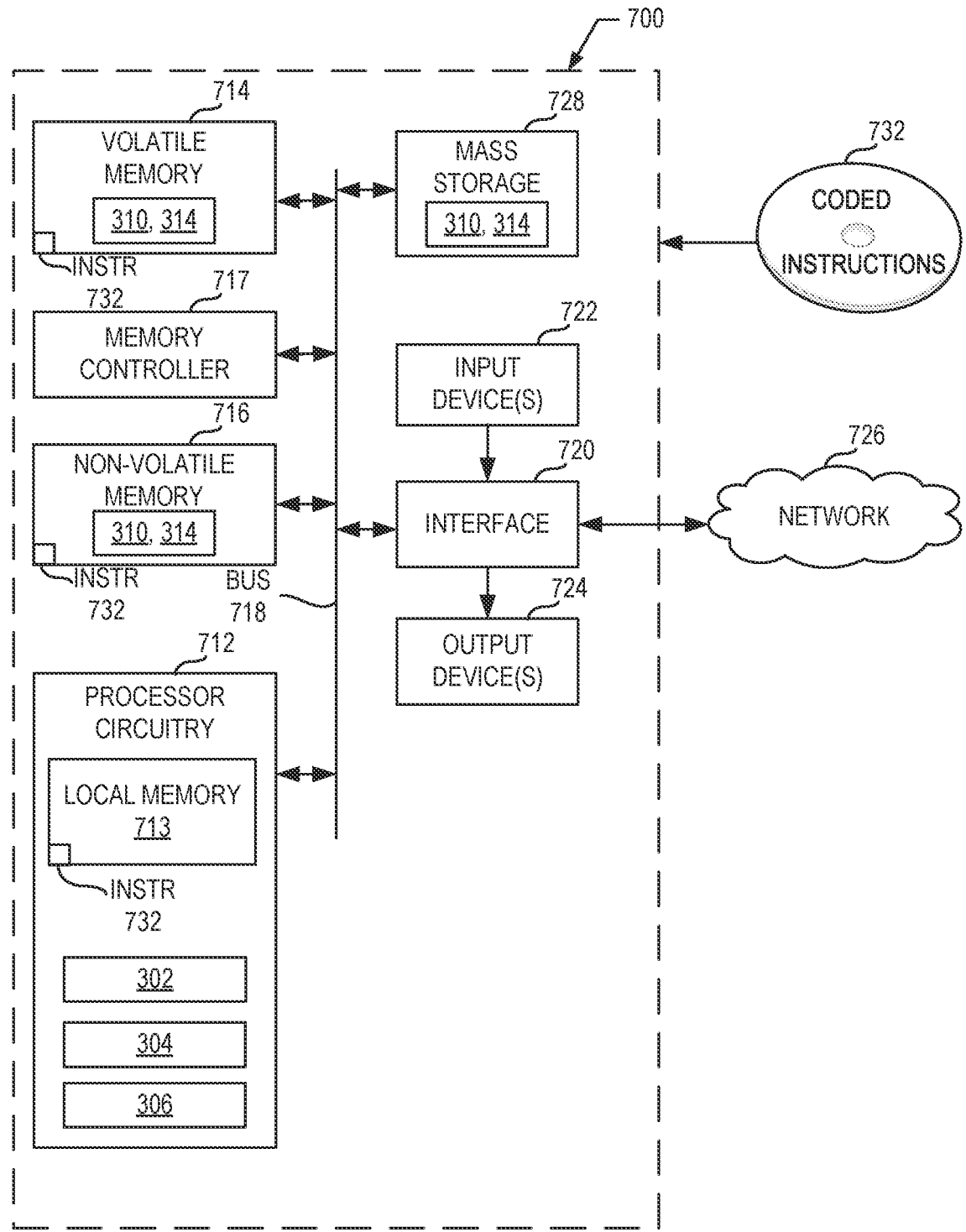
FIG. 7 is a block diagram of an example processing platform including processor circuitry structured to execute the example machine readable instructions and/or the example operations of FIG. 5 to implement the machine learning model training circuitry of FIG. 3.

FIG. 7 is a block diagram of an example processor platform 700 structured to execute and/or instantiate the machine readable instructions and/or the operations of FIG. 5 to implement the machine learning model training circuitry 300 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example training control circuitry 302, the example neural network training circuitry 304, and the example neural network processor circuitry 306.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 5, may be stored in the mass storage device 728, in the volatile memory 714, in the non-volatile memory 716, and/or on a removable non-transitory computer readable storage medium such as a CD or DVD.

Figure 8:
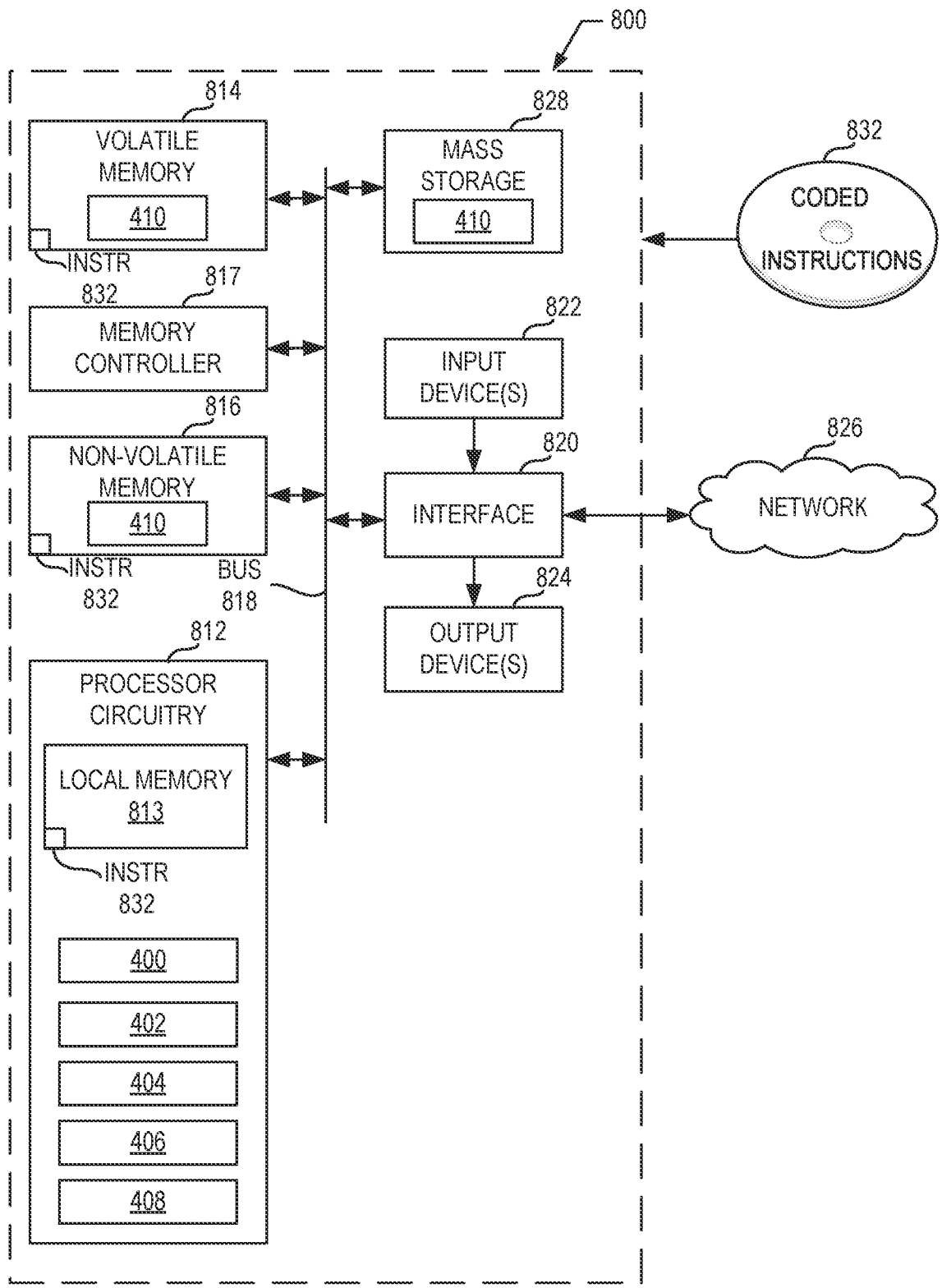
FIG. 8 is a block diagram of an example processing platform including processor circuitry structured to execute the example machine readable instructions and/or the example operations of FIG. 6 to implement the docking control circuitry of FIG. 4.

FIG. 8 is a block diagram of an example processor platform 800 structured to execute and/or instantiate the machine readable instructions and/or the operations of FIG. 6 to implement the docking control circuitry 126 of FIG. 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 812 implements the example platform classification circuitry 400, the example confidence determination circuitry 402, the example docking position control circuitry 404, the example monitoring circuitry 406, and the example feedback circuitry 408.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIG. 6, may be stored in the mass storage device 828, in the volatile memory 814, in the non-volatile memory 816, and/or on a removable non-transitory computer readable storage medium such as a CD or DVD.

Figure 9:
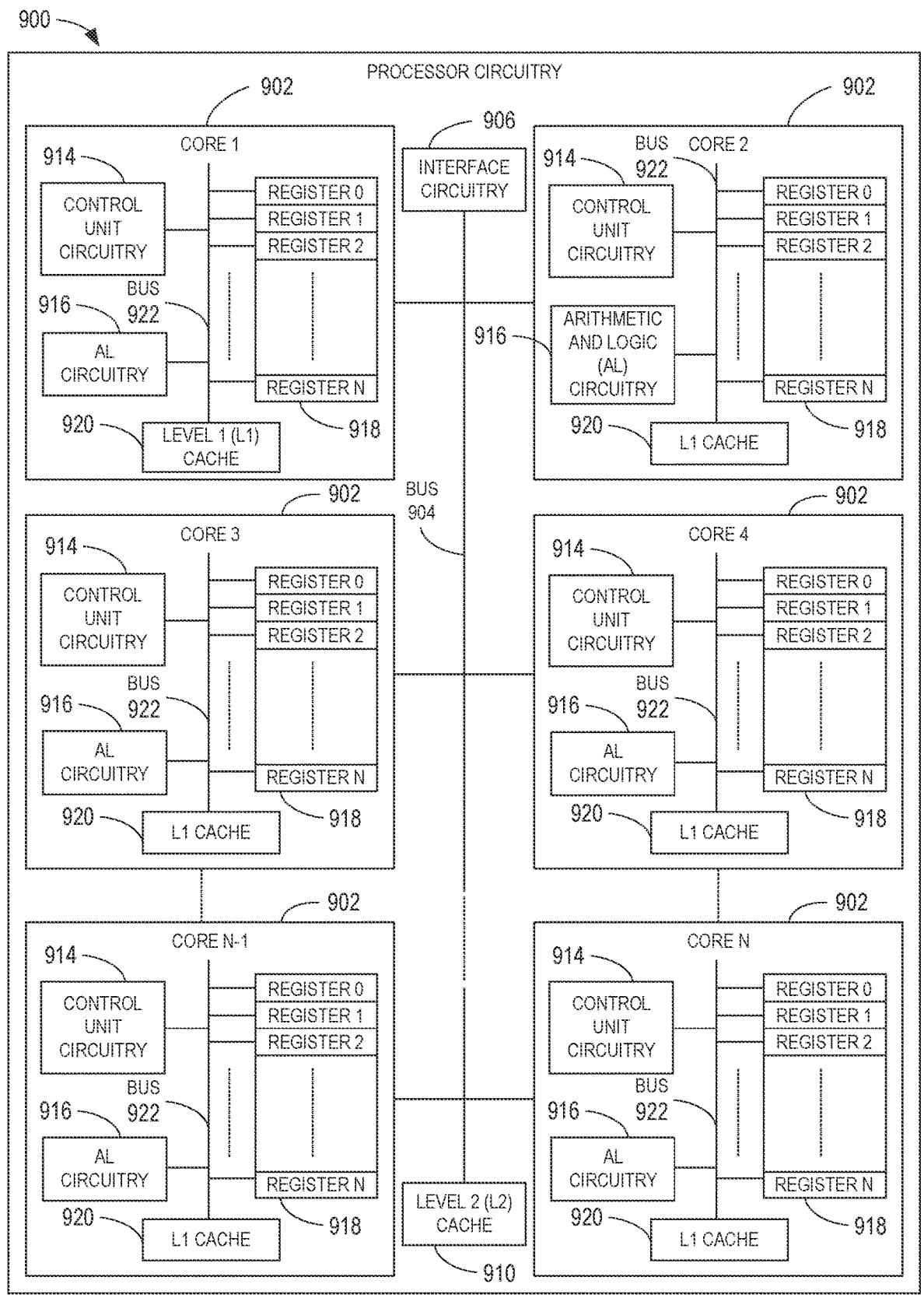
FIG. 9 is a block diagram of an example implementation of the processor circuitry of FIGS. 7 and/or 8.

FIG. 9 is a block diagram of an example implementation of the processor circuitry 712 of FIG. 7 and/or the processor circuitry 812 of FIG. 8. In this example, the processor circuitry 712 of FIG. 7 and/or the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowcharts of FIGS. 5 and/or 6 to effectively instantiate the circuitry of FIGS. 3 and/or 4 as logic circuits to perform the operations corresponding to those machine readable instructions. In some such examples, the circuitry of FIGS. 3 and/or 4 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5 and/or 6.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 714, 716 of FIG. 7, the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
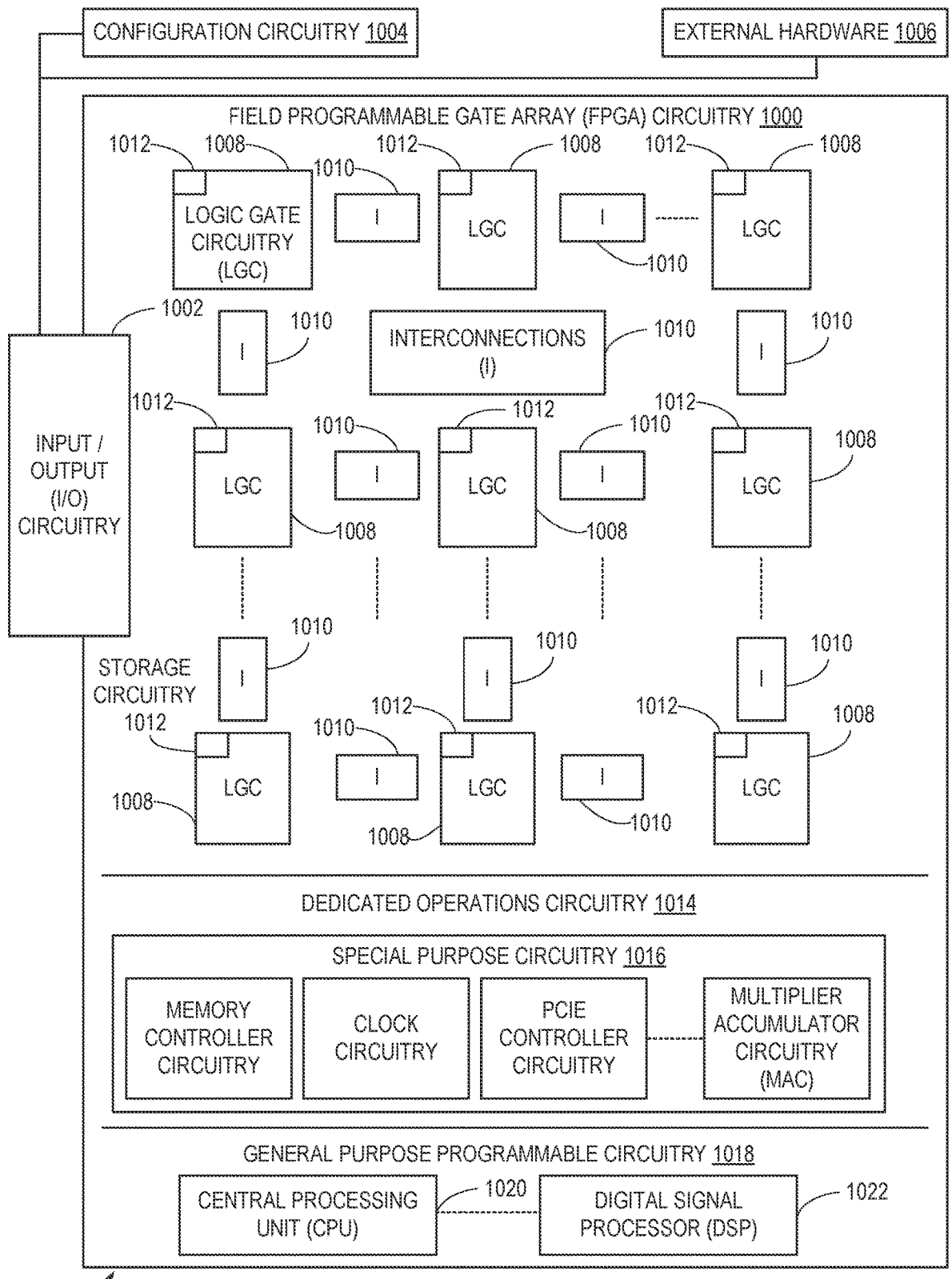
FIG. 10 is a block diagram of another example implementation of the processor circuitry of FIGS. 7 and/or 8.

FIG. 10 is a block diagram of another example implementation of the processor circuitry 712 of FIG. 7 and/or the processor circuitry 812 of FIG. 8. In this example, the processor circuitry 712 and/or the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 5 and/or 6 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 5 and/or 6. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 5 and/or 6. As such, the FPGA circuitry 1000 may be structured to effectively instantiate some or all of the machine readable instructions of the flowcharts of FIGS. 5 and/or 6 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5 and/or 6 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 5 and/or 6 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 712 of FIG. 7 and/or the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 712 of FIG. 7 and/or the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 5 and/or 6 may be executed by one or more of the cores 902 of FIG. 9, a second portion of the machine readable instructions represented by the flowcharts of FIGS. 5 and/or 6 may be executed by the FPGA circuitry 1000 of FIG. 10, and/or a third portion of the machine readable instructions represented by the flowcharts of FIGS. 5 and/or 6 may be executed by an ASIC. It should be understood that some or all of the circuitry of FIGS. 3 and/or 4 may, thus, be instantiated at the same or different times. Some or all of the circuitry may be instantiated, for example, in one or more threads executing concurrently and/or in series. Moreover, in some examples, some or all of the circuitry of FIGS. 3 and/or 4 may be implemented within one or more virtual machines and/or containers executing on the microprocessor.

In some examples, the processor circuitry 712 of FIG. 7 and/or the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 712 of FIG. 7 and/or the processor circuitry 812 of FIG. 8, which may be in one or more packages. For example, the XPU may include a CPU in one package, a DSP in another package, a GPU in yet another package, and an FPGA in still yet another package.

Figure 11:
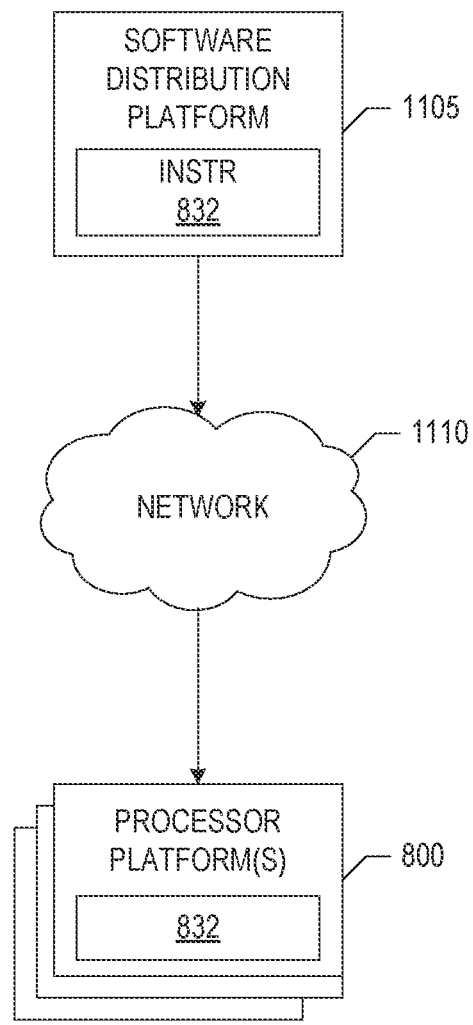
FIG. 11 is a block diagram of an example software distribution platform (e.g., one or more servers) to distribute software (e.g., software corresponding to the example machine readable instructions of FIG. 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 600 of FIG. 6, as described above. The one or more servers of the example software distribution platform 1105 are in communication with an example network 1110, which may correspond to any one or more of the Internet and/or any of the example networks 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 832 of FIG. 8, may be downloaded to the example processor platform 800, which is to execute the machine readable instructions 832 to implement the docking control circuitry 126. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that provide for selective docking between a robotic vehicle and a platform (e.g., a pallet) based on properties associated the pallet and/or load carried by the platform to facilitate transport of the platform via the vehicle. Examples disclosed herein execute machine learning model(s) to evaluate whether the robotic vehicle should initiate a docking event with the platform based on the associated platform properties. When the vehicle is to dock with the platform based on the confidence analysis, examples disclosed herein execute machine learning model(s) to direct or guide the coupling between the robotic vehicle and the platform to prevent damage or substantial damage to the platform, any load carried by the platform, and/or the robotic vehicle. Examples disclosed herein monitor the docking between the vehicle and the platform and provide for dynamic adjustments to the docking operations to maintain structural integrity of the platform, the load, and/or the vehicle.

Example systems, apparatus, and methods to facilitate docking of robotic vehicles with platforms are disclosed herein. Further examples and combinations thereof include the following:

Example 1 includes an apparatus comprising memory; machine readable instructions; and processor circuitry to execute the machine readable instructions to identify a property associated with a platform; determine a confidence associated with docking the platform and an autonomous vehicle based on the property associated with the platform; identify a positioning maneuver to be performed by the autonomous vehicle relative to the platform based on the confidence and the property of the platform; and output an instruction to cause the autonomous vehicle to perform the positioning maneuver.

Example 2 includes the apparatus of example 1, wherein the processor circuitry is to perform a comparison of the confidence to a threshold, the identifying of the positioning maneuver responsive to the confidence satisfying the threshold; and responsive to the confidence failing to satisfy the threshold, cause an alert to be output.

Example 3 includes the apparatus of examples 1 or 2, wherein the property associated with the platform includes one or more of a shape of the platform, a size of the platform, an orientation of the platform in an environment, a location of the platform in the environment, a platform construction state, a platform maintenance state, or a property of a load supported by the platform.

Example 4 includes the apparatus of any of examples 1-3, wherein the property associated with the platform is a first property associated with the platform and the processor circuitry is to identify a second property associated with the platform based on data corresponding to an output of a sensor when a fork of the autonomous vehicle is at least partially engaged with the platform; adjust the positioning maneuver based on the second property; and output an instruction to cause the autonomous vehicle to perform the adjusted positioning maneuver.

Example 5 includes the apparatus of any of examples 1-4, wherein the processor circuitry is to determine an orientation of the platform relative to a fork of the autonomous vehicle when a fork of the autonomous vehicle is at least partially engaged with the platform based on data corresponding to an output of a sensor the autonomous vehicle; adjust the positioning maneuver based on the orientation; and output an instruction to cause the autonomous vehicle to perform the adjusted positioning maneuver.

Example 6 includes the apparatus of any of examples 1-5, wherein the processor circuitry is to identify the property associated with the platform based on image data output by a sensor of the autonomous vehicle.

Example 7 includes the apparatus of any of examples 1-6, wherein the processor circuitry is to execute one or more machine learning models to determine the confidence.

Example 8 includes the apparatus of any of examples 1-7, wherein the property includes a weight of a load supported by the platform and the processor circuitry is to identify a first positioning maneuver to cause the autonomous vehicle to move a fork of the autonomous vehicle to a first position relative to the platform when the load is associated with a first weight; and identify a second positioning maneuver to cause the autonomous vehicle to move the fork to a second position relative to the platform when the load is associated with a second weight.

Example 9 includes a non-transitory machine readable storage medium comprising instructions that, when executed, cause processor circuitry to at least generate a classification for a platform based on outputs of one or more sensors, the one or more sensors carried by at least one of the platform or an autonomous vehicle; cause the autonomous vehicle to perform a first positioning maneuver based on the classification to position the autonomous vehicle relative to the platform to dock with the platform; and cause the autonomous vehicle to perform a second positioning maneuver to undock from the platform.

Example 10 includes the non-transitory machine readable storage medium of example 9, wherein the classification includes one or more of a property of the platform or a property of a load supported by the platform.

Example 11 includes the non-transitory machine readable storage medium of examples 10 or 11, wherein the property of the platform includes an orientation or a location of the platform in an environment.

Example 12 includes the non-transitory machine readable storage medium of any of examples 9-11, wherein the one or more sensors includes one or more of an image sensor or a proximity sensor carried by a fork of the autonomous vehicle and the instructions, when executed, cause the processor circuitry to cause the autonomous vehicle to perform a third positioning maneuver based on data corresponding to outputs of the one or more of the image sensor or the proximity sensor.

Example 13 includes the non-transitory machine readable storage medium of any of examples 9-12, wherein the instructions, when executed, cause the processor circuitry to cause the autonomous vehicle to perform the third positioning maneuver to adjust a position of the fork relative to the platform, the third positioning maneuver different than the first positioning maneuver.

Example 14 includes the non-transitory machine readable storage medium of any of examples 9-13, wherein the instructions, when executed, cause the processor circuitry to detect a change in the classification based on outputs of the one or more sensors when the autonomous vehicle is performing the first positioning maneuver; and cause the autonomous vehicle to perform the second positioning maneuver in response to the change.

Example 15 includes the non-transitory machine readable storage medium of any of examples 9-14, wherein the instructions, when executed, cause the processor circuitry to cause the cause the autonomous vehicle to perform the second positioning maneuver in response to an indication that the autonomous vehicle has arrived at a destination.

Example 16 includes the non-transitory machine readable storage medium of any of examples 9-15, wherein the instructions, when executed, cause the processor circuitry to generate a confidence level associated with docking the platform and the autonomous vehicle.

Example 17 includes a method comprising identifying, by executing an instruction with at least one processor, one or more of a property of a platform or a property of a load carried by the platform; selecting a positioning maneuver to be performed by a robotic vehicle relative to the platform based on the one or more of the property of the platform or the property of the load; and outputting an instruction to cause the robotic vehicle to perform the positioning maneuver.

Example 18 includes the method of example 17, wherein the identifying includes identifying the property of the platform, the property of the platform being a first property of the platform and further including identifying a second property of the platform based on data corresponding to an output of a sensor when a fork of the robotic vehicle is at least partially engaged with the platform; adjusting the positioning maneuver based on the second property; and outputting an instruction to cause the robotic vehicle to perform the adjusted positioning maneuver.

Example 19 includes the method of examples 17 or 18, wherein selecting the positioning maneuver includes executing one or more machine learning models to select the positioning maneuver.

Example 20 includes the method of any of examples 17-19, wherein the identifying includes identifying the property of the load and further including identifying a first positioning maneuver to cause the robotic vehicle to move a fork of the robotic vehicle to a first position relative to the platform when the property is a first load property; and identifying a second positioning maneuver to cause the robotic vehicle to move the fork to a second position relative to the platform when the property is a second load property.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   memory;
   machine readable instructions; and
   at least one processor circuit to execute the machine readable instructions to:
      identify a property associated with a platform;
      determine a docking likelihood that an autonomous vehicle will be able to dock with the platform, the docking likelihood based on the property associated with the platform;
      perform a comparison of the docking likelihood to a threshold;
      determine that the docking likelihood fails to satisfy the threshold; and
      responsive to the docking likelihood failing to satisfy the threshold, cause an alert to be output, the alert corresponding to an indication for an operator to manually perform a positioning maneuver to dock the autonomous vehicle with the platform.

2. The apparatus of claim 1, wherein the property associated with the platform includes one or more of a shape of the platform, a size of the platform, an orientation of the platform in an environment, a location of the platform in the environment, a platform construction state, a platform maintenance state, or a property of a load supported by the platform.

3. The apparatus of claim 1, wherein the platform is a first platform, the docking likelihood is a first docking likelihood, and one or more of the at least one processor circuit is to:
   identify a first property associated with a second platform;
   determine a second docking likelihood that the autonomous vehicle will be able to dock with the second platform, the second docking likelihood based on the first property associated with the second platform;
   determine that the second docking likelihood satisfies the threshold;
   responsive to the second docking likelihood satisfying the threshold, output an instruction to cause the autonomous vehicle to perform a positioning maneuver to dock the autonomous vehicle with the second platform;
   identify a second property associated with the second platform based on data corresponding to an output of a sensor when a fork of the autonomous vehicle is at least partially engaged with the second platform;
   adjust the positioning maneuver based on the second property; and
   output an instruction to cause the autonomous vehicle to perform the adjusted positioning maneuver.

4. The apparatus of claim 1, wherein the platform is a first platform, the docking likelihood is a first docking likelihood, and one or more of the at least one processor circuit is to:
   identify a property associated with a second platform;
   determine a second docking likelihood that the autonomous vehicle will be able to dock with the second platform, the second docking likelihood based on the property associated with the second platform;
   determine that the second docking likelihood satisfies the threshold;
   responsive to the second docking likelihood satisfying the threshold, output an instruction to cause the autonomous vehicle to perform a positioning maneuver to dock the autonomous vehicle with the second platform;
   determine an orientation of the second platform relative to a fork of the autonomous vehicle when the fork is at least partially engaged with the second platform based on data corresponding to an output of a sensor the autonomous vehicle;
   adjust the positioning maneuver based on the orientation; and
   output an instruction to cause the autonomous vehicle to perform the adjusted positioning maneuver.

5. The apparatus of claim 1, wherein one or more of the at least one processor circuit is to identify the property associated with the platform based on image data output by a sensor of the autonomous vehicle.

6. The apparatus of claim 1, wherein one or more of the at least one processor circuit is to execute one or more machine learning models to determine the docking likelihood.

7. The apparatus of claim 1, wherein the platform is a first platform, the docking likelihood is a first docking likelihood, and one or more of the at least one processor circuit is to:
   identify a property associated with a second platform, wherein the property includes a weight of a load supported by the second platform;
   determine a second docking likelihood that the autonomous vehicle will be able to dock with the second platform, the second docking likelihood based on the property associated with the second platform;
   determine that the second docking likelihood satisfies the threshold;
   responsive to the second docking likelihood satisfying the threshold,
      identify a first positioning maneuver to cause the autonomous vehicle to move a fork of the autonomous vehicle to a first position relative to the second platform when the load is associated with a first weight; and
      identify a second positioning maneuver to cause the autonomous vehicle to move the fork to a second position relative to the second platform when the load is associated with a second weight.

8. The apparatus of claim 6, wherein one or more of the at least one processor circuit is to cause feedback to be output for training the one or more of the machine learning models, the feedback indicative of the docking likelihood failing to satisfy the threshold.

9. At least one non-transitory machine readable storage medium comprising machine readable instructions to cause at least one processor circuit to at least:
   generate a classification for a platform based on outputs of one or more sensors, the one or more sensors carried by at least one of the platform or an autonomous vehicle;
   determine a docking likelihood that the autonomous vehicle will be able to dock with the platform, the docking likelihood based on the classification;
   perform a comparison of the docking likelihood to a threshold;
   determine that the docking likelihood fails to satisfy the threshold; and responsive to the docking likelihood failing to satisfy the threshold, cause an alert to be output, the alert representing a request for an operator to manually perform a positioning maneuver to position the autonomous vehicle relative to the platform to dock the autonomous vehicle with the platform.

10. The at least one non-transitory machine readable storage medium of claim 9, wherein the classification includes one or more of a property of the platform or a property of a load supported by the platform.

11. The at least one non-transitory machine readable storage medium of claim 10, wherein the property of the platform includes an orientation or a location of the platform in an environment.

12. The at least one non-transitory machine readable storage medium of claim 9, wherein the one or more sensors includes one or more of an image sensor or a proximity sensor carried by a fork of the autonomous vehicle.

13. The at least one non-transitory machine readable storage medium of claim 9, wherein the docking likelihood is a first docking likelihood and the one or more sensors are carried by the autonomous vehicle and the machine readable instructions are to cause one or more of the at least one processor circuit to:
    generate a classification for a second platform based on outputs of the one or more sensors;
    determine a second docking likelihood that the autonomous vehicle will be able to dock with the second platform, the second docking likelihood based on the classification for the second platform;
    determining that the second docking likelihood satisfies the threshold; and
    responsive to the second docking likelihood satisfying the threshold, cause the autonomous vehicle to perform a first positioning maneuver to position the autonomous vehicle relative to the second platform to dock the autonomous vehicle with the second platform.

14. The at least one non-transitory machine readable storage medium of claim 13, wherein the machine readable instructions are to cause one or more of the at least one processor circuit to cause the autonomous vehicle to perform a second positioning maneuver to adjust a position of a fork of the autonomous vehicle relative to the second platform, the second positioning maneuver different than the first positioning maneuver.

15. The at least one non-transitory machine readable storage medium of claim 13, wherein the machine readable instructions are to cause one or more of the at least one processor circuit to:
    detect a change in the classification for the second platform based on outputs of the one or more sensors when the autonomous vehicle is performing the first positioning maneuver; and
    cause the autonomous vehicle to perform a second positioning maneuver in response to the change, the second positioning maneuver to cause the autonomous vehicle to undock from the platform.

16. The at least one non-transitory machine readable storage medium of claim 13, wherein the machine readable instructions are to cause one or more of the at least one processor circuit to cause the cause the autonomous vehicle to perform the second positioning maneuver in response to an indication that the autonomous vehicle has arrived at a destination, the second positioning maneuver to cause the autonomous vehicle to undock from the second platform.

17. A method comprising:
    identifying, by at least one processor circuit executing at least one instruction, one or more of a property of a platform or a property of a load carried by the platform;
    determining a docking likelihood that a robotic vehicle will be able to dock with the platform, the docking likelihood based on the one or more of the property of the platform or the property of the load;
    performing a comparison of the docking likelihood to a threshold;
    determining that the docking likelihood fails to satisfy the threshold; and
    responsive to the docking likelihood failing to satisfy the threshold, outputting an alert, the alert corresponding to an indication for an operator to manually perform a positioning maneuver to dock the robotic vehicle with the platform.

18. The method of claim 17, wherein the platform is a first platform, the docking likelihood is a first docking likelihood, and further including:
    identifying one or more of a first property associated with a second platform or a property of a load carried by the second platform;
    determining a second docking likelihood that the robotic vehicle will be able to dock with the second platform, the second docking likelihood based on the one or more of the first property associated with the second platform or the property of the load;
    determining that the second docking likelihood satisfies the threshold;
    responsive to the second docking likelihood satisfying the threshold, output an instruction to cause the robotic vehicle to perform a positioning maneuver to dock the robotic vehicle with the second platform;
    identifying a second property of the second platform based on data corresponding to an output of a sensor when a fork of the robotic vehicle is at least partially engaged with the second platform;
    adjusting the positioning maneuver based on the second property; and
    outputting an instruction to cause the robotic vehicle to perform the adjusted positioning maneuver.

19. The method of claim 18, further including executing one or more machine learning models to select the positioning maneuver.

20. The method of claim 17, wherein the platform is a first platform, the docking likelihood is a first docking likelihood, and further including:
    identifying a property of a load carried by a second platform;
    determining a second docking likelihood that the robotic vehicle will be able to dock with the second platform, the second docking likelihood based on the property associated with the load;
    determining that the second docking likelihood satisfies the threshold; and
    responsive to the second docking likelihood satisfying the threshold,
        identifying a first positioning maneuver to cause the robotic vehicle to move a fork of the robotic vehicle to a first position relative to the platform when the property is a first load property; and
        identifying a second positioning maneuver to cause the robotic vehicle to move the fork to a second position relative to the platform when the property is a second load property.

* * * * *